United States Patent
Lee et al.

(10) Patent No.: US 11,465,535 B2
(45) Date of Patent: Oct. 11, 2022

(54) AUTONOMOUS VEHICLE CONTROL METHOD

(71) Applicant: LG Electronics Inc., Seoul (KR)

(72) Inventors: Kyoungha Lee, Seoul (KR); Inyoung Hwang, Seoul (KR); Kangmin Kim, Seoul (KR); Sungil Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 537 days.

(21) Appl. No.: 16/487,034

(22) PCT Filed: May 9, 2019

(86) PCT No.: PCT/KR2019/005523
§ 371 (c)(1),
(2) Date: Aug. 19, 2019

(87) PCT Pub. No.: WO2020/226210
PCT Pub. Date: Nov. 12, 2020

(65) Prior Publication Data
US 2021/0331605 A1  Oct. 28, 2021

(51) Int. Cl.
| | | |
|---|---|---|
| *B60R 22/00* | (2006.01) | |
| *B60N 2/00* | (2006.01) | |
| *B60N 2/806* | (2018.01) | |
| *B60N 2/16* | (2006.01) | |
| *B60N 2/20* | (2006.01) | |
| *B60N 2/66* | (2006.01) | |
| *G01C 21/36* | (2006.01) | |
| *G06V 20/59* | (2022.01) | |

(52) U.S. Cl.
CPC .............. *B60N 2/002* (2013.01); *B60N 2/16* (2013.01); *B60N 2/20* (2013.01); *B60N 2/66* (2013.01);
(Continued)

(58) Field of Classification Search
CPC . B60N 2/002; B60N 2/16; B60N 2/20; B60N 2/66; B60N 2/806; B60N 2/01;
(Continued)

(56) References Cited

U.S. PATENT DOCUMENTS

2015/0057839 A1* 2/2015 Chang ................ B60R 16/0373
701/2
2017/0052538 A1* 2/2017 Li ............................ H04W 4/48
(Continued)

FOREIGN PATENT DOCUMENTS

| JP | 09131241 | 5/1997 |
|---|---|---|
| JP | 2002078566 | 3/2002 |

(Continued)

OTHER PUBLICATIONS

International Search Report in International Appln. No. PCT/KR2019/005523, dated Feb. 5, 2020, 5 pages (with English translation).
(Continued)

*Primary Examiner* — Shardul D Patel
(74) *Attorney, Agent, or Firm* — Fish & Richardson P.C.

(57) ABSTRACT

A vehicle control method is disclosed which is a method for adjusting a seat inside a vehicle. The vehicle control method includes: monitoring the surroundings of a passenger sitting in the seat through a camera installed inside the vehicle; sensing an object around the passenger through the monitoring; sending information on the sensed object to a server; receiving a preset seat setting value corresponding to the object information from the server; and adjusting the position of the seat according to the seat setting value. One or more of an autonomous vehicle according to the present invention, a user terminal, and a server may be associated with artificial intelligence, a robot, augmented reality (AR), virtual reality (VR), etc.

9 Claims, 19 Drawing Sheets

(52) U.S. Cl.
CPC ......... *B60N 2/806* (2018.02); *G01C 21/3691* (2013.01); *G06V 20/593* (2022.01)

(58) Field of Classification Search
CPC .................... B60N 2/0228; B60N 2/22; B60N 2002/0268; B60N 2/0248; B60N 2/02; G01C 21/3691; G06V 20/593; B60W 40/08; B60W 30/14; B60W 40/10; B60W 2040/0881; B60W 2420/42; B60W 2554/00; B60R 22/00
USPC .......................................................... 701/49
See application file for complete search history.

(56) References Cited

U.S. PATENT DOCUMENTS

2018/0072188 A1\* 3/2018 Yamada .................... B60N 2/02
2018/0111511 A1 4/2018 Lota

FOREIGN PATENT DOCUMENTS

KR 20130050680 A \* 5/2013
KR 1020130050680 5/2013

OTHER PUBLICATIONS

Korean Notice of Allowance in Korean Appln. No. 10-2019-7019228, dated Apr. 27, 2020, 5 pages (with English translation).

\* cited by examiner (a)

(b)

(c)

(a)

(b)

(c)

AUTONOMOUS VEHICLE CONTROL METHOD

CROSS-REFERENCE TO RELATED APPLICATIONS

This application is a National Stage application under 35 U.S.C. § 371 of International Application No. PCT/KR2019/005523, filed on May 9, 2019, the disclosure of which is hereby incorporated by reference in its entirety.

TECHNICAL FIELD

The present invention relates to a method for controlling an autonomous vehicle.

BACKGROUND ART

A vehicle may be classified as an internal combustion engine vehicle, an external combustion engine vehicle, a gas turbine vehicle, or an electric vehicle depending on the type of motor used.

In recent years, smart vehicles have been actively developed for the safety or convenience of drivers, pedestrians, etc., and active research is ongoing on sensors mounted on smart vehicles. Cameras, infrared sensors, radar, GPS, Lidar, gyroscopes, etc. are being used in smart vehicles, among which cameras serve to substitute for human eyes.

Due to the development of various types of sensors and electronic equipment, vehicles with a function for providing service to a passenger during driving are attracting attention.

Notably, seat position control tailored to each passenger is becoming an issue.

DISCLOSURE

Technical Problem

An aspect of the present invention is to provide a method for controlling a vehicle.

Another aspect of the present invention is to provide a method for adjusting a seat according to a seat setting value corresponding to an object a passenger carries.

Another aspect of the present invention is to provide a method for adjusting a seat according to a seat setting value corresponding to a passenger's behavior or posture.

Another aspect of the present invention is to provide a method for adjusting a seat according to a seat setting value corresponding to driving route information.

Technical Solution

An exemplary embodiment of the present invention provides a vehicle control method for adjusting a seat, the vehicle control method including: monitoring the surroundings of a passenger sitting in the seat through a camera installed inside the vehicle; sensing an object around the passenger through the monitoring; sending information on the sensed object to a server; receiving a preset seat setting value corresponding to the object information from the server; and adjusting the position of the seat according to the seat setting value.

The pre-stored object may include at least one of a mobile terminal, a notebook computer, and a book.

The vehicle control method may further include, when the position of the seat is adjusted according to the seat setting value, and, upon detecting an additional position adjustment of the seat, sending a seat setting value reflecting the additional position adjustment to the server.

The vehicle control method may further include, after the additional position adjustment is reflected on the seat, sending information on the passenger's posture sensed through the camera to the sever.

The vehicle control method may further include, if the preset seat setting value corresponding to the object information is not received from the server, sending the current seat setting value to the server.

The preset seat setting value may include at least one of a seat height adjustment value, a tilt adjustment value, a lumbar support adjustment value, and a headrest adjustment value.

The vehicle control method may further include: sensing a posture of the passenger through the monitoring; sending information on the sensed posture of the passenger to the server; if the preset seat setting value corresponding to the object information is not received from the server, receiving a preset, second seat setting value corresponding to the posture information from the server; and adjusting the position of the seat according to the second seat setting value.

The pre-stored behavior of the passenger may include at least one of the passenger's direction of gaze, the passenger's hand motion, and the positional relationship between the passenger and the object.

The vehicle control method may further include, when the position of the seat is adjusted according to the second seat setting value, and, upon detecting an additional position adjustment of the seat, sending a seat setting value reflecting the additional position adjustment to the server.

The vehicle control method may further include, if the preset, second seat setting value corresponding to the posture information is not received from the server, sending the current seat setting value to the server.

The vehicle control method may further include: if the preset seat setting value corresponding to the object information is not received from the server, receiving driving route information and a preset, third seat setting value corresponding the driving route information from the server; and adjusting the position of the seat according to the third seat setting value.

The driving route information may include at least one of the vehicle's current location information, driving start time, driving speed information, origin information, destination information, information about a route from the origin to the destination, expected time required, driving route-based weather information, driving route-based road surface information, road information, topographical information, driving route-based traffic information, driving route-based traffic light information, en-route information, vehicle stop information, and driving mode information.

Advantageous Effects

A vehicle control device according to the present invention has the following advantages.

According to at least one exemplary embodiment of the present invention, it is possible to provide a method for adjusting a seat according to a seat setting value corresponding to an object a passenger carries.

According to at least one exemplary embodiment of the present invention, it is possible to provide a method for adjusting a seat according to a seat setting value corresponding to a passenger's behavior or posture.

According to at least one exemplary embodiment of the present invention, it is possible to provide a method for adjusting a seat according to a seat setting value corresponding to driving route information.

MODE FOR INVENTION

Figure 1:
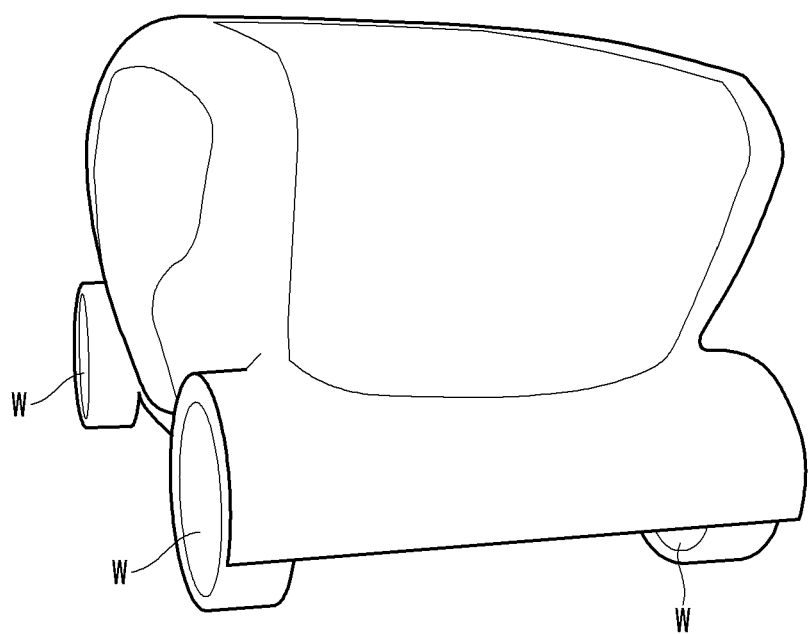
FIG. 1 shows an exterior appearance of a vehicle with a vehicle control device according to an exemplary embodiment of the present invention.
Figure 1:
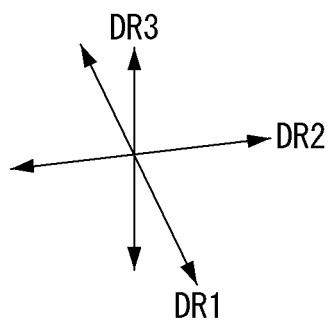

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a car and a motorcycle. Hereinafter, a car will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, a passenger, and a fellow passenger may be used interchangeably depending on the embodiment.

In the following description, the vehicle control device 400 is a separate device provided in the vehicle 700, and may exchange necessary information with the vehicle 700 through data communication. The vehicle control device 400 may include at least some of the units of the vehicle 700. The vehicle control device 400 may be referred to as a control device 400, a driving assistance device 400, a vehicle driving assistance device 400, or an assistance device 400.

Alternatively, at least some of the units of the vehicle control device 400 may be a unit(s) of the vehicle 700 or of another device mounted in the vehicle 700. Such external units may be understood as being included in the vehicle control device 400 by transmitting and receiving data through an interface unit of the vehicle control device 400.

FIG. 1 shows an exterior appearance of a vehicle with a vehicle control device according to an exemplary embodiment of the present invention.

Referring to FIG. 1, the vehicle 700 may include wheels W that rotate by a source of power. A first direction DR1 may be referred to as a forward and backward direction. The vehicle 700 may move forward or backward in the first direction DR1. A second direction DR2 may be perpendicular to the first direction DR1. The second direction DR2 may be referred to as a left and right direction. A third direction DR3 may be perpendicular to the first direction DR1 or second direction DR2. The third direction DR3 may be referred to as an upward and downward direction.

Figure 2:
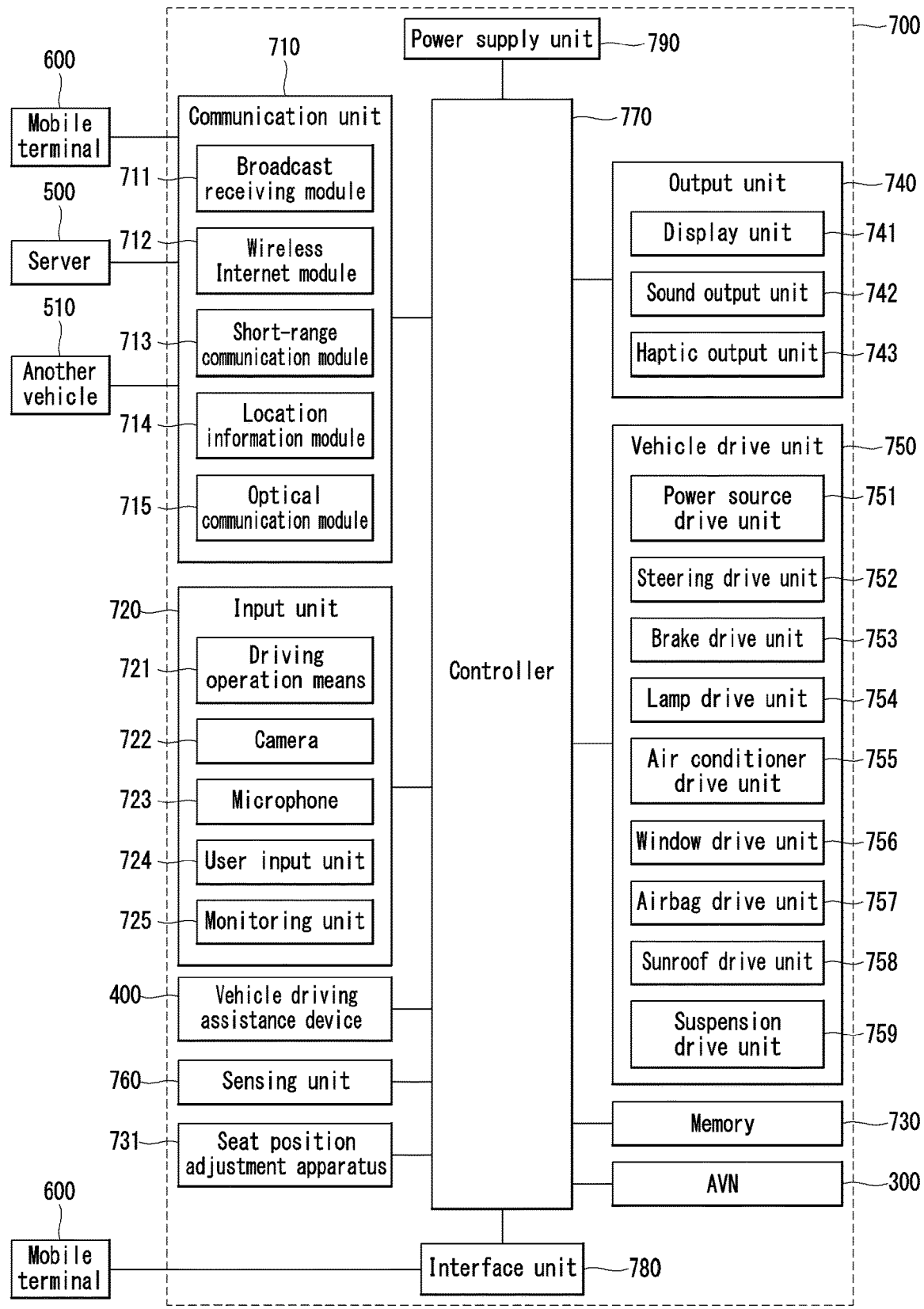
FIG. 2 is an example of an internal block diagram of the vehicle.

FIG. 2 is a block diagram illustrating one example of the vehicle 700 of FIG. 1.

The vehicle may include a communication unit 710, an input unit 720, a sensing unit 760, an output unit 740, a vehicle drive unit 750, a memory 730, an interface unit 780, a controller 770, a power source unit 790, a control device 100, and an AVN apparatus 300. The communication unit 710 may include one or more modules to enable the wireless communication between the vehicle and the mobile terminal 600, between the vehicle and an external server 500, or between the vehicle and another vehicle 510. In addition, the communication unit 710 may include one or more modules to connect the vehicle to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 500 in a wireless manner. The wireless Internet module 712 may receive weather information and road traffic state information (e.g., Transport Protocol Expert Group (TPEG) information) from the external server 500.

The short-range communication module 713 may assist short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user boards the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 510 via optical communication.

The input unit 720 may include a driving operation unit 721, a camera 722, a microphone 723, and a user input unit 724.

The driving operation unit 721 is configured to receive user input for the driving of the vehicle. The driving operation unit 721 may include a steering input unit 721*a*, a shift input unit 721*b*, an acceleration input unit 721*c*, and a brake input unit 721*d*.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and a monitoring unit 725 to capture an image of the interior of the vehicle.

The monitoring unit 725 may capture an image of a passenger. The monitoring unit 725 may capture an image of biometrics of the passenger.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to sense signals associated with, for example, the traveling of the vehicle 700. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor based on the rotation of a steering wheel, a vehicle interior temperature sensor, a vehicle interior humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle interior temperature information, vehicle interior humidity information, and steering wheel rotation angle information.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to sense and acquire biometric information of the passenger. The biometric information may include fingerprint information, iris-scan information, retina-scan information, hand geometry information, facial recognition information, and voice recognition information. The biometric information sensing unit may include a sensor to sense biometric information of the passenger. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include a display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which senses a touch to the display unit 741 so as to receive a control command in a touch manner.

When a touch is input to the display unit 741 as described above, the touch sensor may sense the touch and the controller 770 may generate a control command corresponding to the touch. Content input in a touch manner may be characters or numbers, or may be, for example, instructions in various modes or menu items that may be designated.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700. For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770. In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. As such, the direction of travel of the vehicle may be changed.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the interior temperature of the vehicle 700 is high, the air conditioner drive unit 755 may operate the air conditioner to supply cold air to the interior of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown) inside the vehicle 700. For example, when the road surface is uneven, the suspension drive unit 759 may control the suspension apparatus to reduce vibration of the vehicle 700.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the control device 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The power source unit 790 may supply power required to operate the respective components under the control of the controller 770. In particular, the power source unit 790 may receive power from, for example, a battery (not illustrated) inside the vehicle 700.

The AVN apparatus 300 may exchange data with the controller 770. The controller 770 may receive navigation information from the AVN apparatus 300 or a separate navigation apparatus (not illustrated). Here, the navigation information may include set destination information, destination based routing information, and map information or vehicle location information related to vehicle traveling.

The vehicle control device 400 may be understood as included in the vehicle 700.

A seat position adjustment apparatus 731 may be referred to as a seat position adjustment system 731 or seating system 731. The seat position adjustment apparatus 731 may move, tilt, or rotate a seat inside the vehicle 700. The seat position adjustment apparatus 731 may control a seating arrangement by moving, tilting, or rotating a seat inside the vehicle 700.

Figure 3:
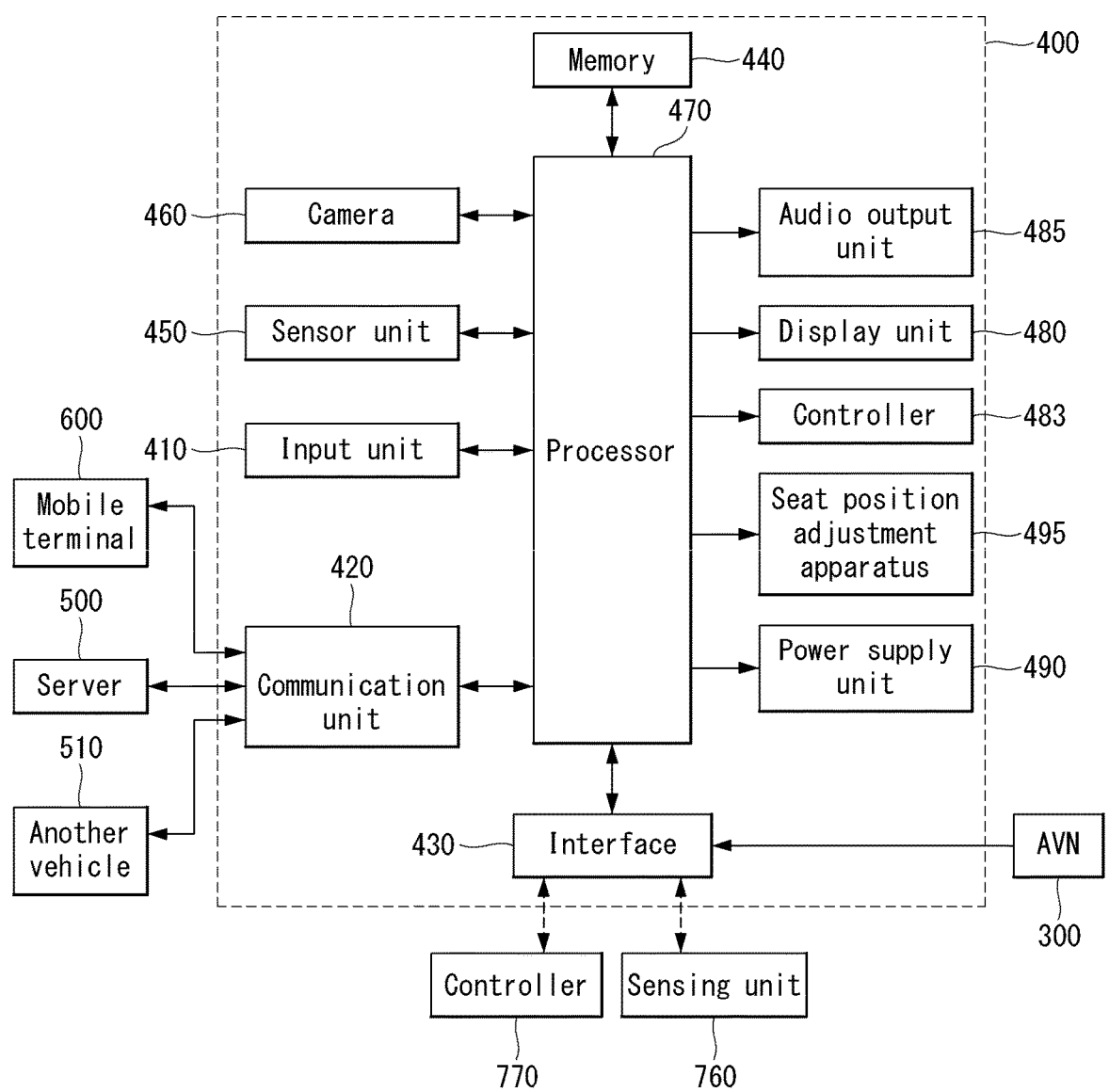
FIG. 3 is an example of an internal block diagram of the vehicle control device according to an exemplary embodiment of the present invention.

FIG. 3 is an example of an internal block diagram of the vehicle control device according to an exemplary embodiment of the present invention.

Referring to FIG. 3, the vehicle control device 400 may include an input unit 410, a communication unit 420, an interface 430, a memory 440 a camera 460, a sensor unit 450, a processor 470, a display unit 480, an audio output unit 485, and a power supply unit 490. The vehicle control device 400 may include additional components in addition to the above-described components, or some of the above-described components may be omitted. Here, units of the same names, among the units included in the vehicle control device 400 and the units included in the vehicle 700 may be included in the vehicle 700 or the vehicle control device 400.

The vehicle control device 400 may include the input unit 410 for receiving user input.

The input unit 410 may include at least one of a gesture input unit (e.g., an optical sensor, etc.) for sensing a user gesture, a touch input unit (e.g., a touch sensor, a touch key, a push key (mechanical key), etc.) for sensing touch, and a microphone for sensing voice input and receive user input.

Next, the vehicle control device 400 may include the communication unit 420 for communicating with another vehicle 510, a terminal 600 and a server 500. The communication unit 420 may be referred to as a wireless communication unit 420.

The vehicle control device 400 may receive communication information including at least one of navigation information, another vehicle 510's traveling information, and traffic information through the communication unit 420. The vehicle control device 400 may send information about the vehicle 700 through the communication unit 420.

The communication unit 420 may receive at least one of position information, weather information and road traffic condition information (e.g., transport protocol experts group (TPEG), etc.) from the mobile terminal 600 and/or the server 500.

The communication unit 420 may receive traffic information from the server 500 having an intelligent traffic system (ITS). Here, the traffic information may include traffic signal information, lane information, vehicle surrounding information or position information.

In addition, the communication unit 420 may receive navigation information from the server 500 and/or the mobile terminal 600. Here, the navigation information may include at least one of map information related to vehicle driving, lane information, vehicle position information, set destination information and route information according to the destination.

For example, the communication unit 420 may receive the real-time position of the vehicle as the navigation information. In detail, the communication unit 420 may include a global positioning system (GPS) module and/or a Wi-Fi (Wireless Fidelity) module and acquire the position of the vehicle.

In addition, the communication unit 420 may receive driving information of another vehicle 510 from the another vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information and turn signal information.

In addition, when a user rides in the vehicle, the mobile terminal 600 of the user and the vehicle control device 400 may pair with each other automatically or by executing a user application.

The communication unit 420 may exchange data with the another vehicle 510, the mobile terminal 600 or the server 500 in a wireless manner. The communication unit 420 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 420 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 420 is configured to facilitate short-range communication. For example, short-range communication may be supported using at least one of Bluetooth™, Radio Frequency Identification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle control device 400 may pair with the mobile terminal located inside the vehicle using a short-range communication method and wirelessly exchange data with the other vehicle 510 or the server 500 using a long-distance wireless communication module of the mobile terminal.

Next, the vehicle control device 400 may include the interface 430 for receiving data of the vehicle 700 and transmitting a signal processed or generated by the processor 470.

The vehicle control device 400 may receive at least one of driving information of another vehicle, navigation information and sensor information via the interface 430. To this end, the interface 430 may perform data communication with at least one of the controller 770 of the vehicle, an audio-video-navigation (AVN) apparatus 300, and the sensing unit 760 using a wired or wireless communication method. The interface 430 may receive navigation information by data communication with the controller 770, the AVN apparatus 300 and/or a separate navigation apparatus. In addition, the interface 430 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor on the basis of rotation of the steering wheel, a vehicle inside temperature sensor, a vehicle inside humidity sensor, a door sensor, etc. The position module may include a GPS module for receiving GPS information.

The interface 430 may receive user input via the user input unit 410 of the vehicle. The interface 430 may receive user input from the input unit of the vehicle or via the controller 770. That is, when the input unit is provided in the vehicle, user input may be received via the interface 430.

In addition, the interface 430 may receive traffic information acquired from the server. The server 500 may be located at a traffic control surveillance center for controlling traffic. For example, when traffic information is received from the server 500 via the communication unit 420 of the vehicle, the interface 430 may receive traffic information from the controller 770.

Next, the memory 440 may store a variety of data for overall operation of the vehicle control device 400, such as a program for processing or control of the processor 470.

In addition, the memory 440 may store data and commands for operation of the vehicle control device 400 and a plurality of application programs or applications executed in the vehicle control device 400. At least some of such application programs may be downloaded from an external server through wireless communication. At least one of such application programs may be installed in the vehicle control device 400 upon release. Such application programs may be stored in the memory 440, and may be executed to perform operation (or function) of the vehicle control device 400 by the processor 470.

The memory 440 may store data for checking an object included in an image. For example, the memory 440 may store data for checking a predetermined object using a predetermined algorithm when the predetermined object is detected from an image of the vicinity of the vehicle acquired through the camera 460. For example, the memory 440 may store data for checking a predetermined object such as a passenger, garbage, or a lost item from an image acquired through the camera 460.

The memory 440 may be implemented in a hardware manner using at least one selected from among a flash memory, a hard disk, a solid state drive (SSD), a silicon disk drive (SDD), a micro multimedia card, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 400 may operate in association with a web storage for performing a storage function of the memory 440 over the Internet.

The sensor unit 450 may acquire information on the internal state of the vehicle 700. The sensor unit 450 may sense a thing or object within the vehicle 700. The camera 460 may capture the inside of the vehicle 700. Alternatively, the camera 460 may capture the vicinity of a seat installed in the vehicle. Alternatively, the camera 460 may capture a passenger in the vehicle 700.

The processor 470 may be referred to as a control unit 470 or a controller 470. The processor 470 may detect an object in the vicinity of the vehicle control device 400 through the camera 460. Alternatively, the processor 470 may detect a passenger, a passenger's belongings, or garbage through the camera 460. The processor 470 may control the operation of the vehicle control device 400.

A controller 483 may receive input for controlling the driving of the vehicle 700. The controller 483 may be a part of the input unit 410. For example, the controller 483 may be a jog dial, button, or gesture receiver.

The seat position adjustment apparatuses 731 and 495 may be identical.

Figure 4:
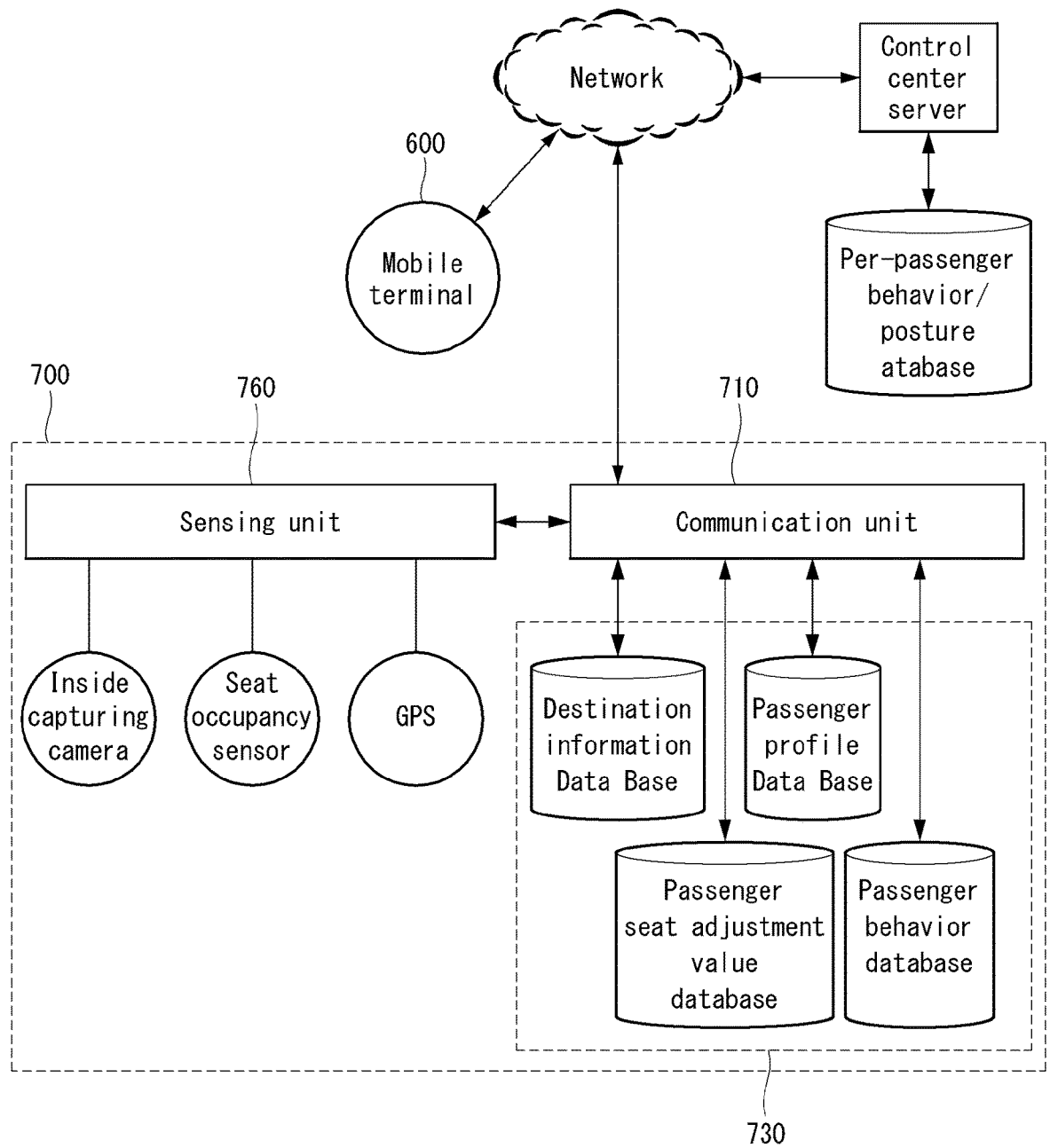
FIG. 4 is a view showing an example of a system according to an exemplary embodiment of the present invention.

FIG. 4 is a view showing an example of a system according to an exemplary embodiment of the present invention.

Referring to FIG. 4, the vehicle 700, the mobile terminal 600, a control center server, and the communication unit 710 may establish a network. The mobile terminal 600, the control center server, a remote control terminal, and the communication unit 710 may exchange information with one another. The traffic information server may exchange information with per-passenger behavior/posture data base.

The sensing unit 760 of the vehicle 700 may include a camera for capturing the inside of the vehicle 700, a GPS, a seat occupancy sensor, and a safety belt tension sensor. The seat occupancy sensor may detect whether a passenger is seated. Alternatively, the seat occupancy sensor may detect the weight distribution of a passenger seat or the distribution of pressure on it.

The memory 730 may include a destination information database, a passenger profile database, a passenger behavior/posture database, and a passenger seat adjustment value database.

Figure 5:
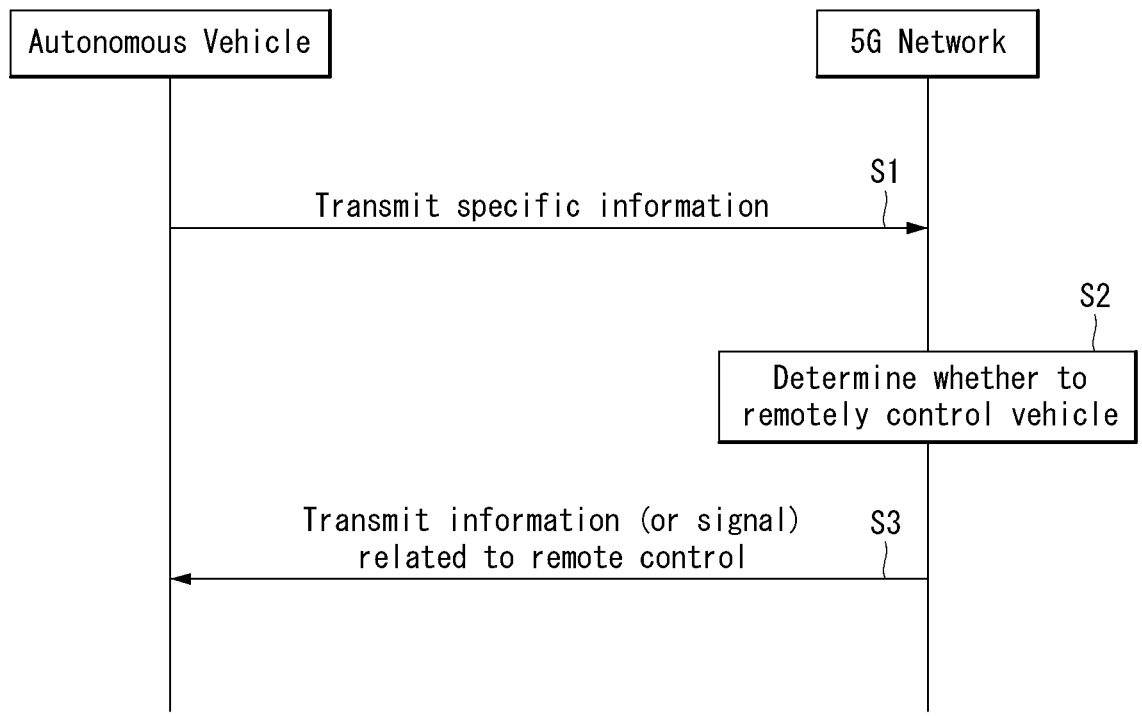
FIG. 5 shows an example of basic operations of an autonomous vehicle and 5G network in a 5G communication system.

FIG. 5 shows an example of basic operations of an autonomous vehicle and 5G network in a 5G communication system.

The autonomous vehicle transmits specific information to a 5G network (S1).

The specific information may include autonomous driving-related information.

The autonomous driving-related information may be information directly related to vehicle driving control. For example, the autonomous driving-related information may include one or more of object data indicating an object around the vehicle, map data, vehicle status data, vehicle location data, and driving plan data.

The autonomous driving-related information may further include service information, etc. that may be provided in an autonomous driving process. For example, the service information may be information about objects located around a passenger which is acquired through a camera inside the vehicle.

The 5G network may determine whether to remotely control the vehicle (S2).

As stated above, information related to the remote control may be a signal applied directly to the autonomous vehicle, and may further service information provided to a passenger inside the vehicle in an autonomous driving process. In one embodiment of the present invention, the autonomous vehicle may transmit to the autonomous vehicle a preset seat setting value corresponding to an object around the passenger inside the vehicle through the 5G network. The autonomous vehicle may adjust the position of a seat according to a received seat setting value.

Here, the 5G network may include a server or module that performs autonomous driving-related remote control.

The 5G network may transmit information (or signal) related to remote control to the autonomous vehicle (S3).

Figure 6:
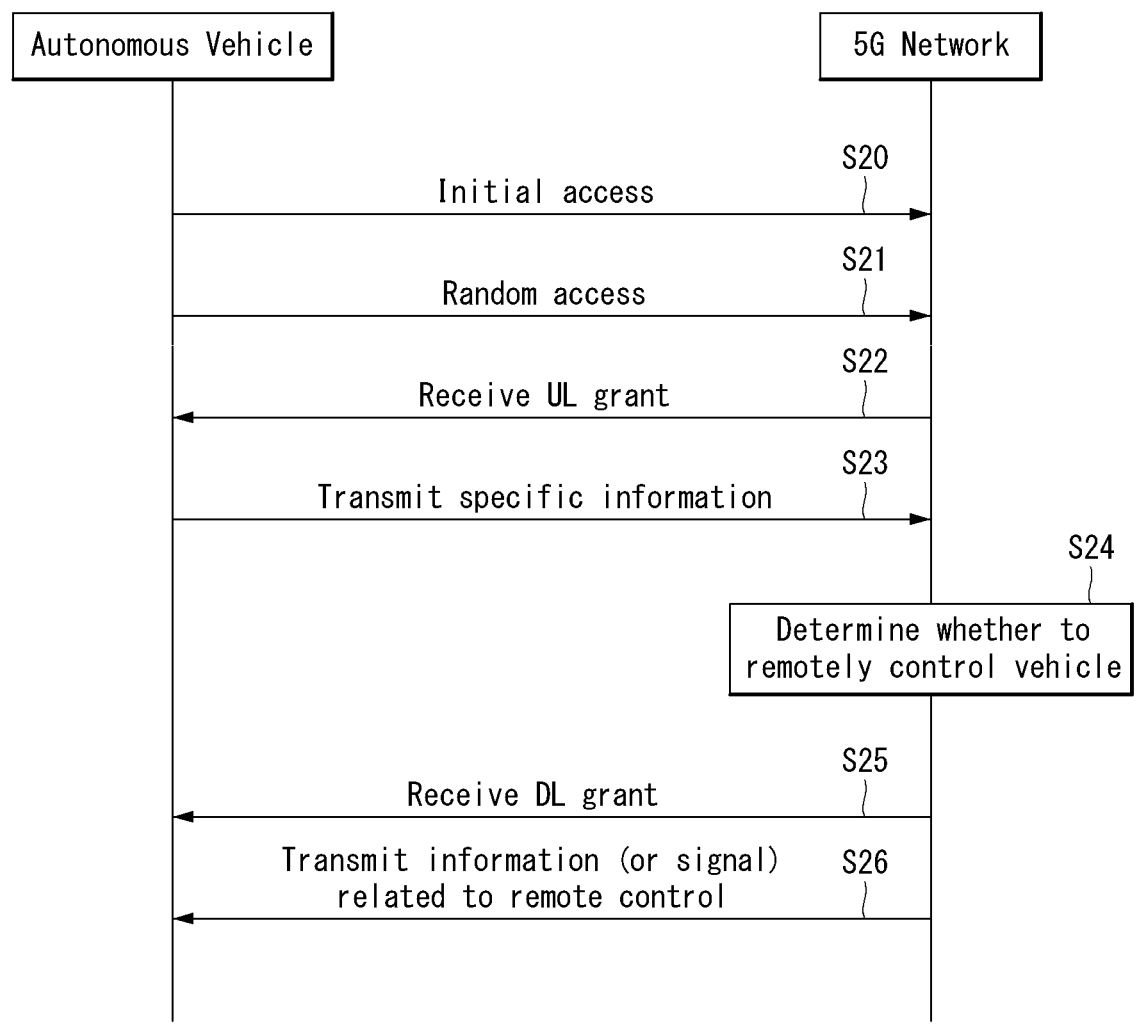
FIG. 6 shows an example of application operations of an autonomous vehicle and 5G network in a 5G communication system.

FIG. 6 shows an example of application operations of an autonomous vehicle and 5G network in a 5G communication system.

The autonomous vehicle performs an initial access procedure with a 5G network (S20).

The initial access procedure may include a cell search for acquiring a downlink (DL) operation, a process of acquiring system information, and so on, which will be described more concretely in the paragraph F.

Then, the autonomous vehicle performs a random access procedure with the 5G network (S21).

The random access process includes preamble transmission and random access response reception processes for acquiring uplink (UL) synchronization or transmitting UL data, which will be described more concretely in the paragraph G.

Then, the 5G network transmits a UL Grant for scheduling transmission of specific information to the autonomous vehicle (S22).

Reception of the UL grant includes a process for time/frequency resource scheduling to transmit UL data, which will be described more concretely in the paragraph H.

Then, the autonomous vehicle transmits specific information to the 5G network based on the UL grant (S23).

Then, the 5G network determines whether to remotely control the vehicle (S24).

Then, the autonomous vehicle receives a DL grant through a physical downlink control channel in order to receive a response to the specific information from the 5G network (S25).

Then, the 5G network transmits information (or signal) related to remote control to the autonomous vehicle based on the DL grant (S26).

Meanwhile, although FIG. 6 illustrates an example of a combination of an initial access process of an autonomous vehicle and 5G communication and/or random access process and a downlink grant reception process through the steps S20 to S26, the present invention is not limited to this.

For example, the initial access process and/or random access process may be performed through the steps S20, S22, S23, S24, and S26. For example, the initial access process and/or random access process may be performed through the steps S21, S22, S23, S24, and S26. Also, a combination of an AI operation and a downlink grant reception process may be performed through the steps S23, S24, S25, and S26.

FIG. 6 illustrates an autonomous vehicle operation through S20 to S26, but the present invention is not limited to this.

For example, the autonomous vehicle operation may be performed by selectively combining S20, S21, S22, and S25 with S23 and S26. Also, for example, the autonomous vehicle operation may consist of S21, S22, S23, and S26. Also, for example, the autonomous vehicle operation may consist of S20, S21, S23, and S26. Also, for example, the autonomous vehicle operation may consist of S22, S23, S25, and S26.

FIGS. 7 to 10 show an example of an autonomous vehicle operation using 5G communication.

Figure 7:
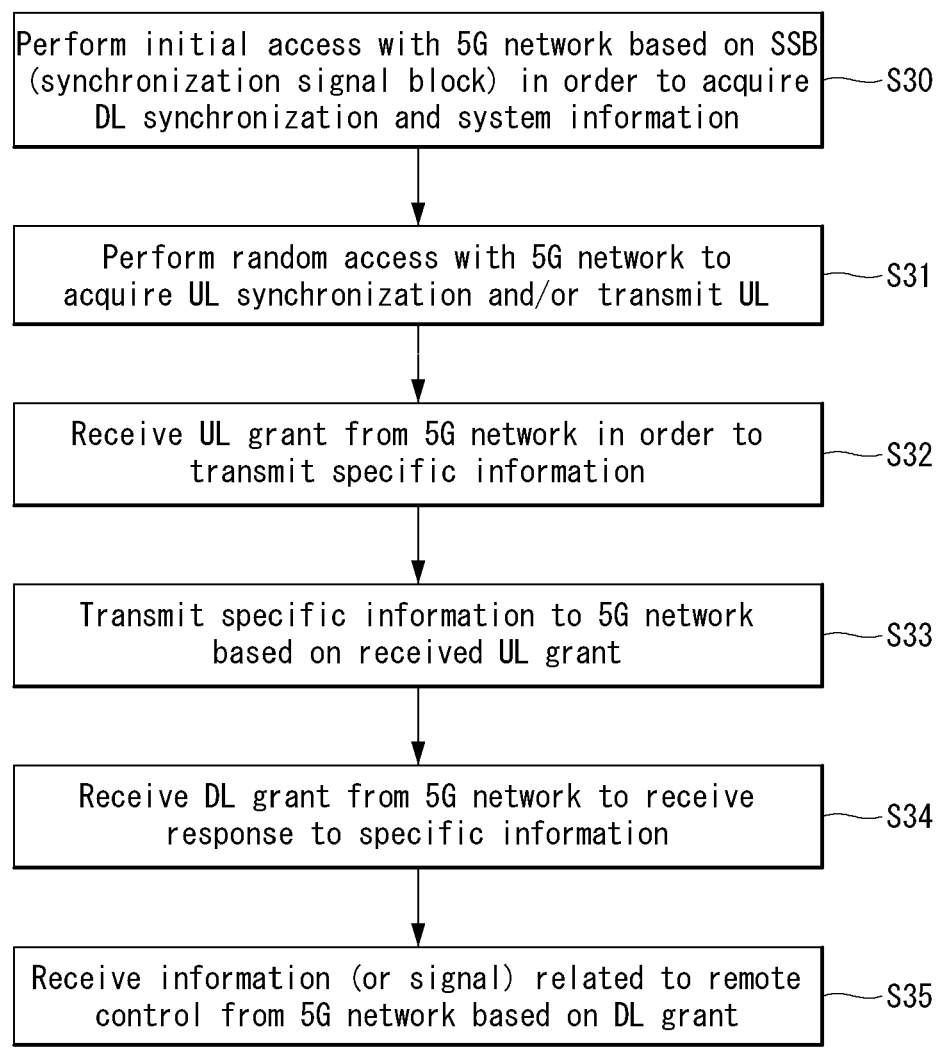
FIGS. 7 to 10 show an example of an autonomous vehicle operation using 5G communication.

First of all, referring to FIG. 7, an autonomous vehicle including an autonomous driving module performs an initial access procedure with a 5G network based on a SSB (synchronization signal block), in order to acquire DL synchronization and system information (S30).

Then, the autonomous vehicle performs a random access procedure with the 5G network to acquire UL synchronization and/or transmit UL (S31).

Then, the autonomous vehicle receives a UL grant from the 5G network in order to transmit specific information (S32).

Then, the autonomous vehicle transmits specific information to the 5G network based on the UL grant (S33).

Then, the autonomous vehicle receives a DL grant from the 5G network to receive a response to the specific information (S34).

Then, the autonomous vehicle receives information (or signal) related to remote control from the 5G network based on the DL grant (S35).

A beam management (BM) process may be added to S30, a beam failure recovery process related to PRACH (physical random access channel) transmission may be added to S31, a QCL relationship may be added to S32 in relation to the direction of beam reception of a PDCCH carrying a UL grant, and a QCL relationship may be added to S33 in relation to the direction of beam transmission of a PUCCH (physical uplink control channel)/PUSCH (physical uplink shared channel) carrying specific information. Also, a QCL relationship may be added to S34 in relation to the direction of beam reception of a PDCCH carrying a DL grant. A more detailed description of this will be given in the paragraph I.

Figure 8:
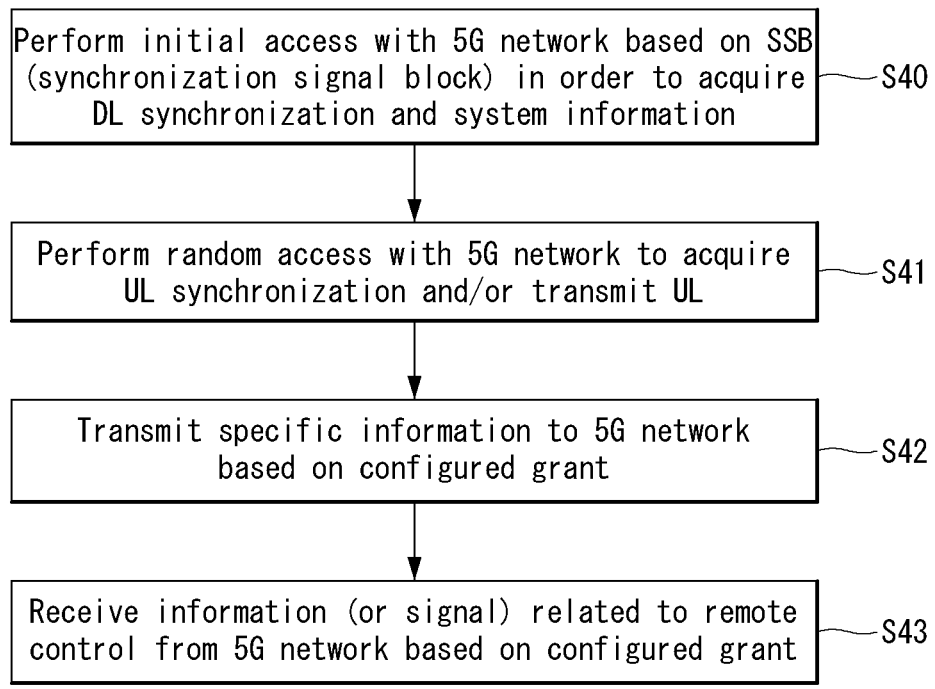

Next, referring to FIG. 8, an autonomous vehicle performs an initial access procedure with a 5G network based on a SSB, in order to acquire DL synchronization and system information (S40).

Then, the autonomous vehicle performs a random access procedure with the 5G network to acquire UL synchronization and/or transmit UL (S41).

Then, the autonomous vehicle transmits specific information to the 5G network based a configured grant (S42). A process of receiving the configured grant, instead of a process of receiving a UL grant from the 5G network, will be described more concretely in the paragraph H.

Then, the autonomous vehicle receives information (or signal) related to remote control from the 5G network based on the configured grant (S43).

Figure 9:
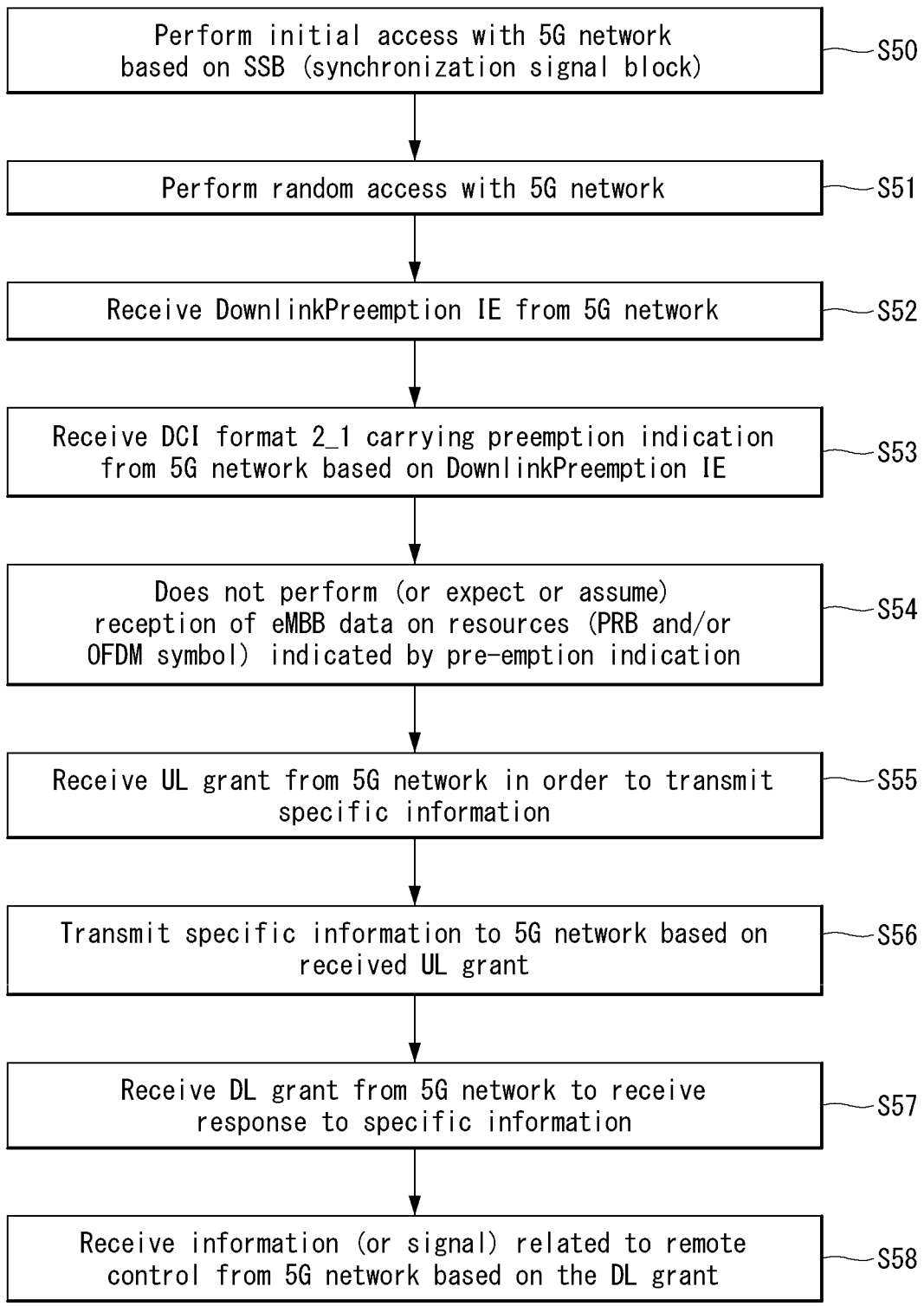

Next, referring to FIG. 9, an autonomous vehicle performs an initial access procedure with a 5G network based on a SSB, in order to acquire DL synchronization and system information (S50).

Then, the autonomous vehicle performs a random access procedure with the 5G network to acquire UL synchronization and/or transmit UL (S51).

Then, the autonomous vehicle receives a DownlinkPreemption IE from the 5G network (S52).

Then, the autonomous vehicle receives a DCI format 2_1 carrying a preemption indication from the 5G network based on the DownlinkPreemption IE (S53).

Then, the autonomous vehicle does not perform (or expect or assume) reception of eMBB data on resources (PRB and/or OFDM symbol) indicated by the pre-emption indication (S54).

An operation related to the preemption indication will be described more concretely in the paragraph J.

Then, the autonomous vehicle receives a UL grant from the 5G network in order to transmit specific information (S55).

Then, the autonomous vehicle transmits specific information to the 5G network based on the UL grant (S56).

Then, the autonomous vehicle receives a DL grant from the 5G network to receive a response to the specific information (S57).

Then, the autonomous vehicle receives information (or signal) related to remote control from the 5G network based on the DL grant (S58).

Figure 10:
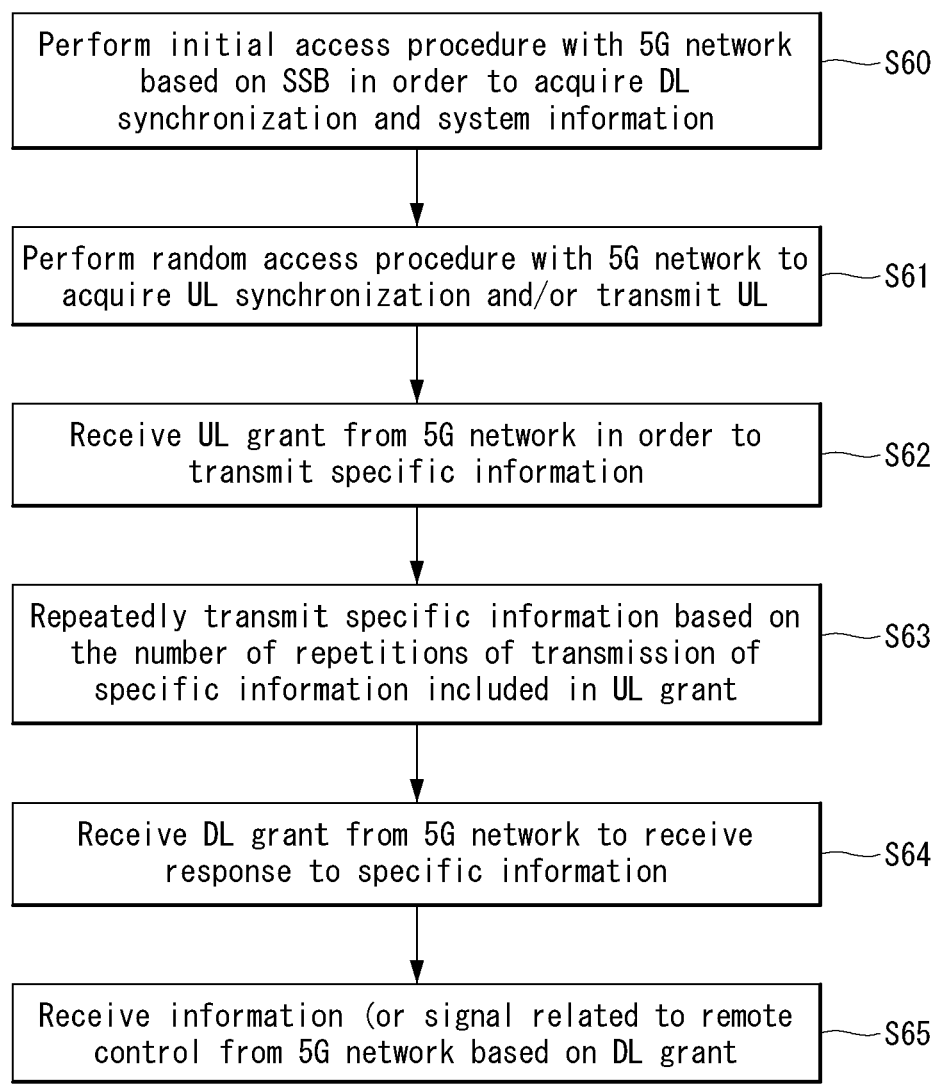

Next, referring to FIG. 10, an autonomous vehicle performs an initial access procedure with a 5G network based on a SSB, in order to acquire DL synchronization and system information (S60).

Then, the autonomous vehicle performs a random access procedure with the 5G network to acquire UL synchronization and/or transmit UL (S61).

Then, the autonomous vehicle receives a UL grant from the 5G network in order to transmit specific information (S62).

The UL grant carries information on the number of repetitions of transmission of the specific information, and the specific information is repeatedly transmitted based on the information on the number of repetitions (S63).

Then, the autonomous vehicle transmits specific information to the 5G network based on the UL grant.

Also, repeated transmission of specific information is performed by frequency hopping, and first specific information may be transmitted on a first frequency resource and second specific information may be transmitted on a second frequency resource.

The specific information may be transmitted over a narrowband of 6RB (Resource Block) or 1RB (Resource Block).

Then, the autonomous vehicle receives a DL grant from the 5G network to receive a response to the specific information (S64).

Then, the autonomous vehicle receives information (or signal) related to remote control from the 5G network based on the DL grant (S65).

One or more of the autonomous vehicle of the present invention and the server may be associated or merged with an artificial intelligence module, an unmanned aerial vehicle (UAV), a robot, an augmented reality (AR) device, virtual reality (VR), a 5G service-related device, and so on.

For example, the autonomous vehicle may operate in association with at least one artificial intelligence (AI) module, robot, etc. included in the vehicle.

For example, the vehicle may interact with at least one robot. The robot may be an autonomous mobile robot (AMR). The mobile robot may move around autonomously and freely and have a plurality of sensors for avoiding obstacles during movement so that it can avoid obstacles. The mobile robot may be a flying robot (e.g., drone) equipped with a flying device. The mobile robot may be a wheeled robot which has at least one wheel and moves by rotating its wheel. The mobile robot may be a legged robot which has at least one leg and moves using the leg.

The robot may function as a device that complements the user's convenience. For example, the robot may perform a function of moving the stuff loaded in the vehicle to the user's final destination. For example, the robot may perform a function of guiding a user who has gotten out of the vehicle to his or her final destination. For example, the robot may perform a function of transporting a user who has gotten out of the vehicle to his or her final destination.

At least one electronic device included in the vehicle may communicate with the robot through a communication device.

At least one electronic device included in the vehicle may provide the robot with data processed by the at least one electronic device included in the vehicle. For example, the at least one electronic device included in the vehicle may provide the robot with at least one of object data indicating an object around the vehicle, map data, vehicle status data, vehicle location data, and driving plan data.

At least one electronic device included in the vehicle may receive data processed by the robot from the robot. The at least one electronic device included in the vehicle may receive at least one of sensing data generated by the robot, object data, robot status data, robot location data, and robot movement plane data.

At least one electronic device included in the vehicle may generate a control signal based further on data received from the robot. For example, the at least one electronic device included in the vehicle may compare information on an object created by an object detection device and information on an object created by the robot, and generate a control signal based on a comparison result. The at least one electronic device included in the vehicle may generate a control signal so as to prevent interference between a vehicle movement path and a robot movement path.

At least one electronic device included in the vehicle may be included in a software module or hardware module (hereinafter, artificial intelligence module) that implements artificial intelligence (AI). The at least one electronic device included in the vehicle may input acquired data into the artificial intelligence module and use data outputted from the artificial intelligence module.

The artificial intelligence module may perform machine learning on input data by using at least one artificial neural network (ANN). The artificial intelligence module may output driving plan data through machine learning on input data.

At least one electronic device included in the vehicle may generate a control signal based on data outputted from the artificial intelligence module.

In some embodiments, at least one electronic device included in the vehicle may receive data processed by artificial intelligence from an external device through a communication device. The at least one electronic device included in the vehicle may generate a control signal based on data processed by artificial intelligence.

FIGS. 11 to 15 show an example in which a seat is adjusted according to a seat setting value corresponding to an object a passenger carries.

Figure 11:
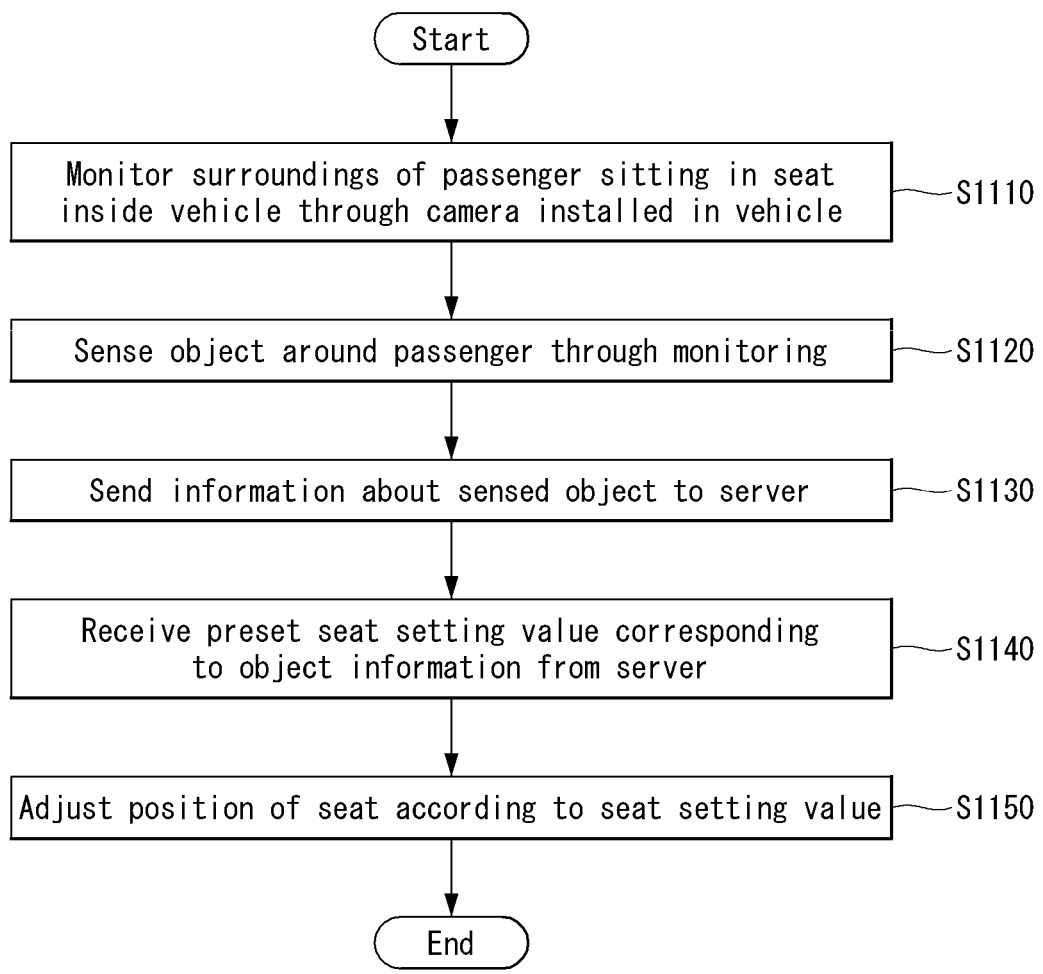
FIGS. 11 to 15 show an example in which a seat is adjusted according to a seat setting value corresponding to an object a passenger carries.

Referring to FIG. 11, the processor 470 may monitor the surroundings of a passenger sitting in a seat inside the vehicle 700, through the camera 460 installed in the vehicle 700 (S1110). The processor 470 may acquire an image or video through the camera 460.

The processor 470 may sense an object around the passenger through monitoring (S1120). The object may include a mobile terminal, a laptop computer, a book, a display device, or an electronic device.

The processor 470 may send information about the sensed object to the server 500 (S1130). The processor 470 may send the object information to the server 500 through the communication unit 420. The object information may be information of a captured image or video of the object. The server 500 may be a control center server 500.

The processor 470 may receive a preset seat setting value corresponding to the object information from the server 500 (S1140). The processor 470 may receive the preset seat setting value through the communication unit 420. The preset seat setting value may include at least one of a seat height adjustment value, a tilt adjustment value, a lumbar support adjustment value, and a headrest adjustment value. The per-passenger behavior/posture database may store a seat setting value corresponding to each object. The server 500 may load a seat setting value corresponding to the sensed object from the per-passenger behavior/posture database.

The processor 470 may adjust the position of a seat according to a seat setting value (S1150). The processor 470 may control the seat position adjusting apparatus 495 to adjust the seat according to the preset seat setting value.

When the position of the seat is adjusted according to the preset seat setting value, and, upon detecting an additional position adjustment of the seat, the processor 470 may send a seat setting value reflecting the additional position adjustment to the server 500. The processor 470 may send the seat setting value reflecting the additional position adjustment to the server 500 through the communication unit 420. The server 500 may update the seat setting value reflecting the additional position adjustment to a seat setting value corresponding to the sensed object.

Moreover, when the position of the seat is adjusted according to the preset seat setting value, and, upon detecting an additional position adjustment of the seat, the processor 470 may send information on the passenger's posture sensed through the camera 460 to the server 500. The server 500 may store the passenger's posture information and the corresponding seat setting value in the database.

In addition, if there is no preset seat setting value corresponding to the sensed object information, the server 500 may inform the processor 470 that there is no preset seat setting value. Alternatively, if there is no preset seat setting value corresponding to the sensed object information, the server 500 may send a certain seat setting value to the processor 470. The certain seat setting value may be a value extracted from a seat setting value corresponding to another passenger or another object. The processor 470 may receive the certain seat setting value and display an image suggesting the certain seat setting value to the passenger or output a sound.

Furthermore, if there is no preset seat setting value corresponding to the sensed object information, the server 500 may inform the processor 470 that there is no preset seat setting value. The processor 470 may send the current seat setting value to the server 500. The server 500 may store the current seat setting value received from the processor 470 in the database, corresponding to the sensed object.

In this case, the specific information of FIG. 5 may include information on an object around the passenger, passenger posture information, or passenger behavior information which is acquired through the camera 460.

In this case, the information transmitted from the 5G network to the vehicle 700 may be a seat setting value corresponding to the object information.

Figure 12:
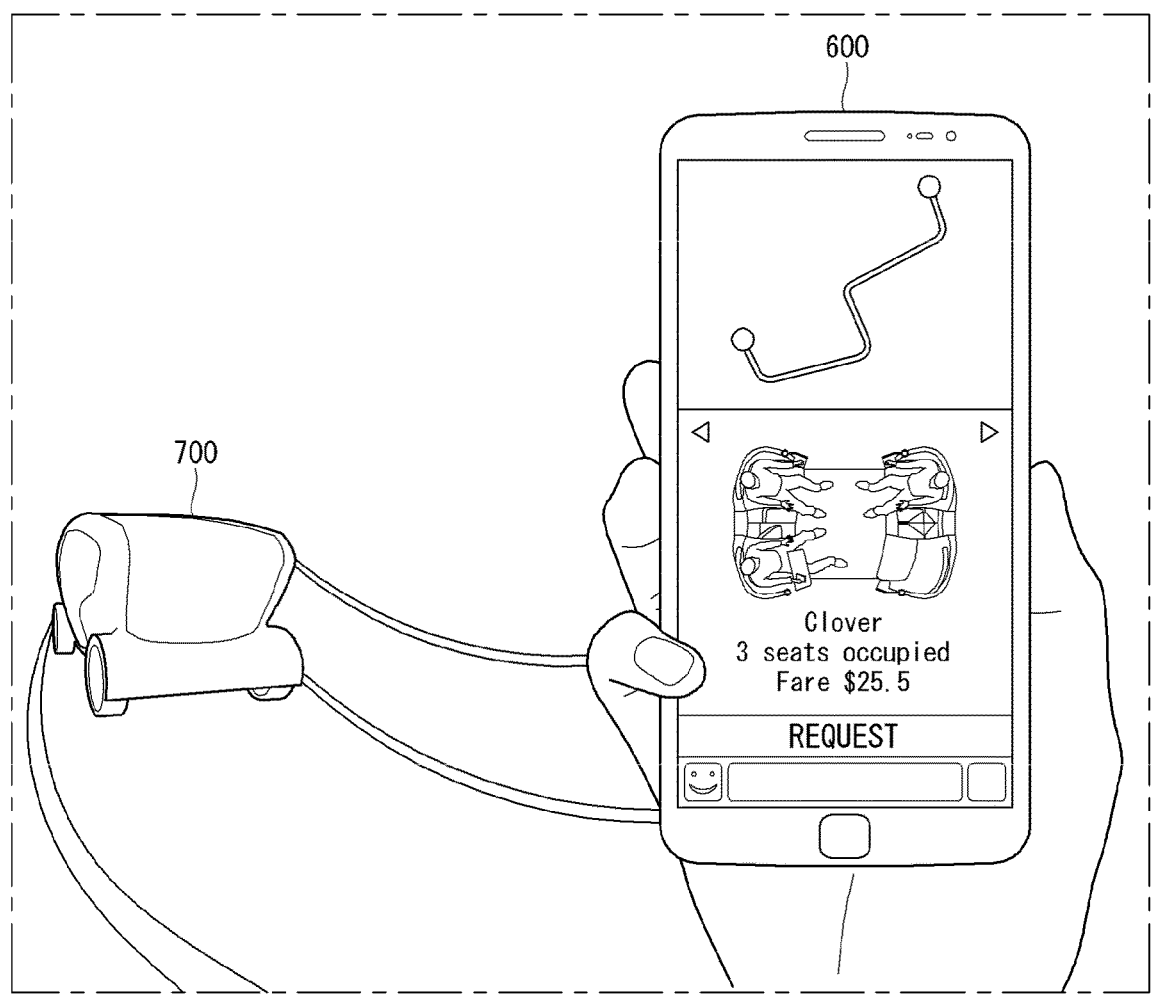

Referring to FIG. 12, the vehicle 700 may drive autonomously. Driving modes of the vehicle 700 may include a manual driving mode, a semi-autonomous driving mode, an autonomous driving mode, etc. The manual driving mode may mean that the vehicle 700 is driven by the driver's operation. The autonomous driving mode may mean that the vehicle 700 is driven without the driver's operation. The autonomous driving mode also may be referred to as an automated driving mode. The semi-autonomous driving mode may mean that part of the driving of the vehicle 700 is done by the driver's operation and the rest of the driving of the vehicle 700 is done without the driver's operation. Alternatively, the processor 470 may control the driving of the vehicle 700 taking control of itself. The control of driving may include at least one among steering control of the vehicle 700, acceleration control of the vehicle 700, brake control of the vehicle 700, light control of the vehicle 700, and wiper control of the vehicle 700. Once a passenger takes over control of driving, the driving mode of the vehicle 700 may be changed to the semi-autonomous driving mode or the manual driving mode.

The processor 470 may receive reserved input information from a passenger before the passenger boards the vehicle 700. The passenger may enter reserved input information in the mobile terminal 600, and the processor 470 may receive the reserved input information from the mobile terminal 600 via the server 500 or a network.

The reserved input information may include at least one of the following: whether the passenger consents to take over control of driving, whether the passenger has a driver's license, whether the passenger is drunk, the passenger's driving experience, seat choice information, ride time, the time the passenger boards the vehicle, the time the passenger gets off the vehicle, the location where the passenger boards the vehicle, and the location where the passenger gets off the vehicle.

Figure 13:
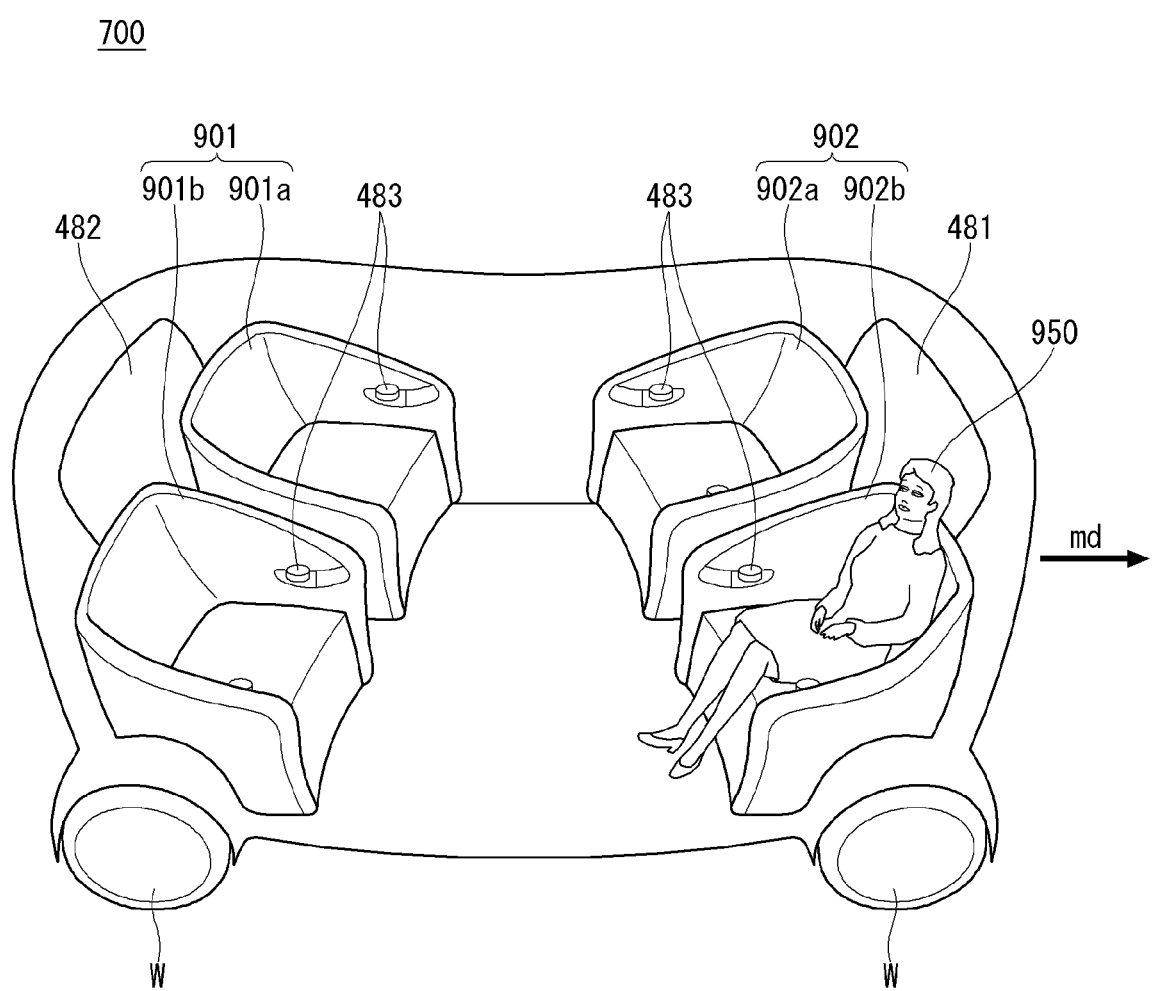

Referring to FIG. 13, forward-facing seats 901 and backward-facing seats 920 may be installed relative to the direction (md) of travel of the vehicle 700. For convenience of explanation, the following description will be given on the assumption that the direction (md) of travel of the vehicle 700 is forward and the opposite direction to the direction (md) of travel of the vehicle 700 is backward. The controller 483 may be installed on every seat 901a, 901b, 902a, and 902b. A plurality of displays 481 and 482 may be provided, and may be installed on the front and back of the vehicle 700, respectively. The front display 481 may be installed ahead of the backward-facing seats 902, and the back display 482 may be installed behind the forward-facing seats 901. The displays 481 and 482 may be moved or slid vertically. The front display 481 may display an image toward the back, and the back display 482 may display an image toward the front.

Figure 14:
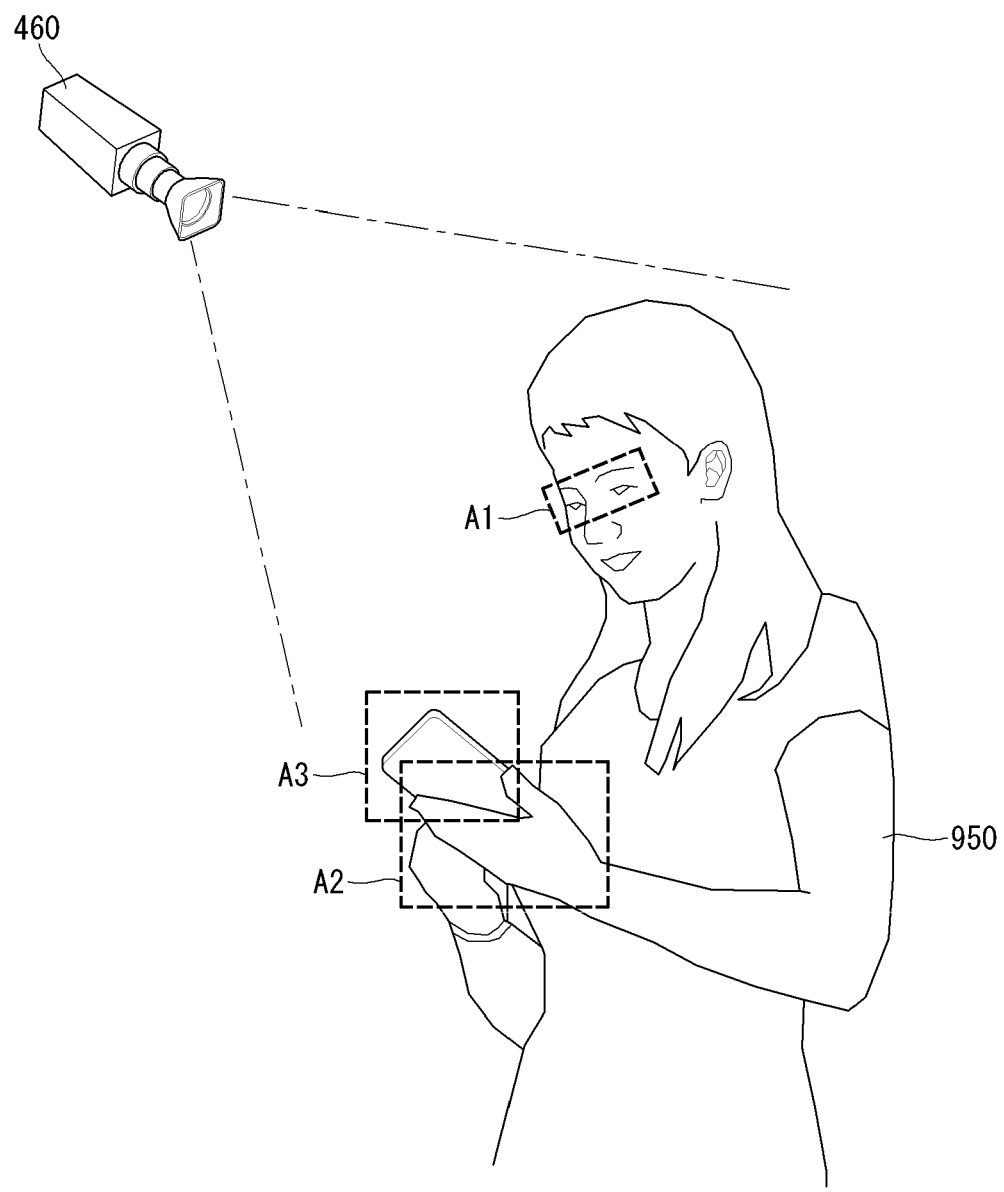

Referring to FIG. 14, the processor 470 may monitor a passenger 950 and the surroundings of the passenger 950 through the camera 460. The processor 470 may sense at least one of the passenger 950's gaze A1, the passenger 950's direction of gaze A1, the passenger 950's hand motion A2, the passenger 950's behavior, the passenger 950's posture, an object A3 around the passenger 950, the positional relationship between the passenger 950 and the object, and the positional relationship between the passenger 950's hand and the object.

Figure 15:
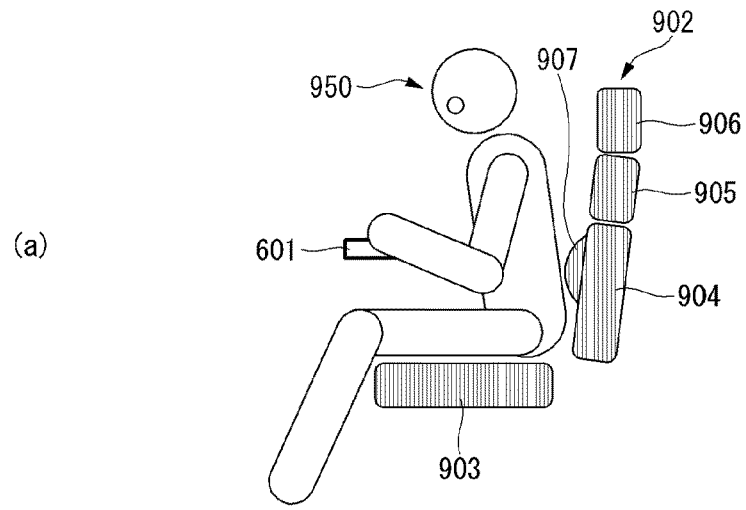
Figure 15:
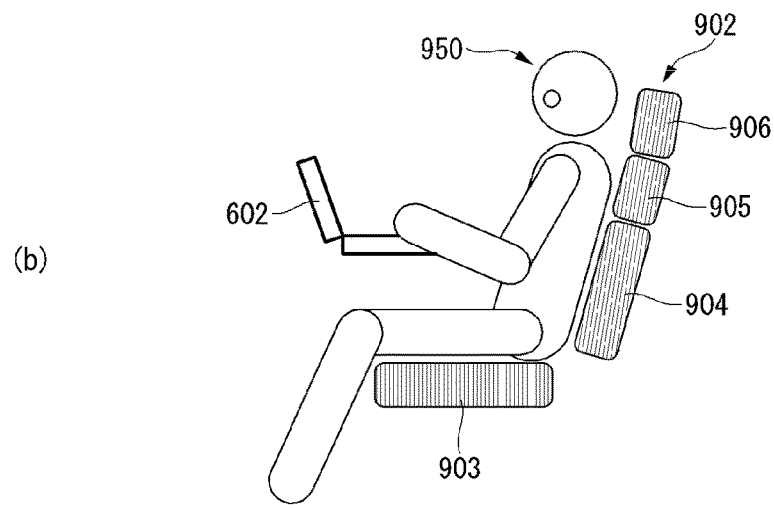
Figure 15:
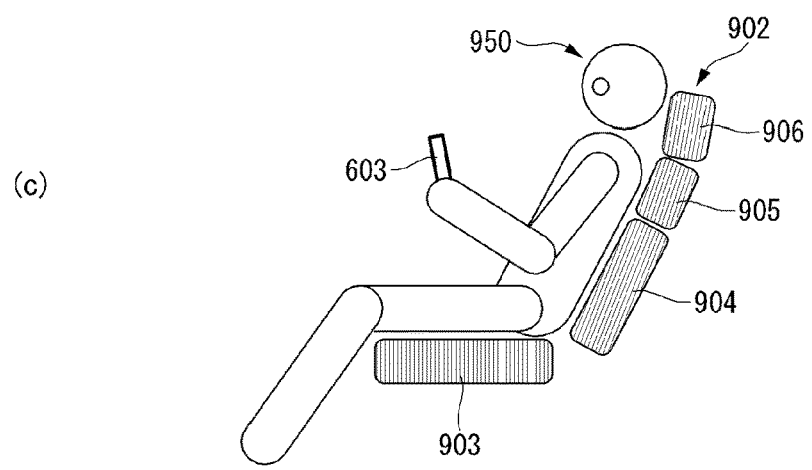

Referring to (a) of FIG. 15, the object may be a book 601. The passenger 950 may read the book 601 in the vehicle 700. The processor 470 may sense the book through the camera 460 and receive a seat setting value corresponding to the book 601 from the server 500. Accordingly, the processor 470 may control the seat position adjustment apparatus 495 to tilt backrest 904, 905, and 906 with respect to a base 903 and activate a lumbar support 907.

Referring to (b) of FIG. 15, the object may be a notebook computer 602. The passenger 950 may use the notebook computer 602 in the vehicle 700. The processor 470 may sense the notebook computer 602 through the camera 460 and receive a seat setting value corresponding to the notebook computer 602 from the server 500. Accordingly, the processor 470 may control the seat position adjustment apparatus 495 to tilt the backrest 904, 905, and 906 with respect to the base 903 and make it fit tightly to the passenger.

Referring to (c) of FIG. 15, the object may be a mobile terminal 603. The passenger 950 may use the mobile terminal 603 in the vehicle 700. The processor 470 may sense the mobile terminal 603 through the camera 460 and receive a seat setting value corresponding to the mobile terminal 603 from the server 500. Accordingly, the processor 470 may control the seat position adjustment apparatus 495 to tilt the backrest 904, 905, and 906 with respect to the base 903 and make it fit tightly to the passenger.

Figure 16:
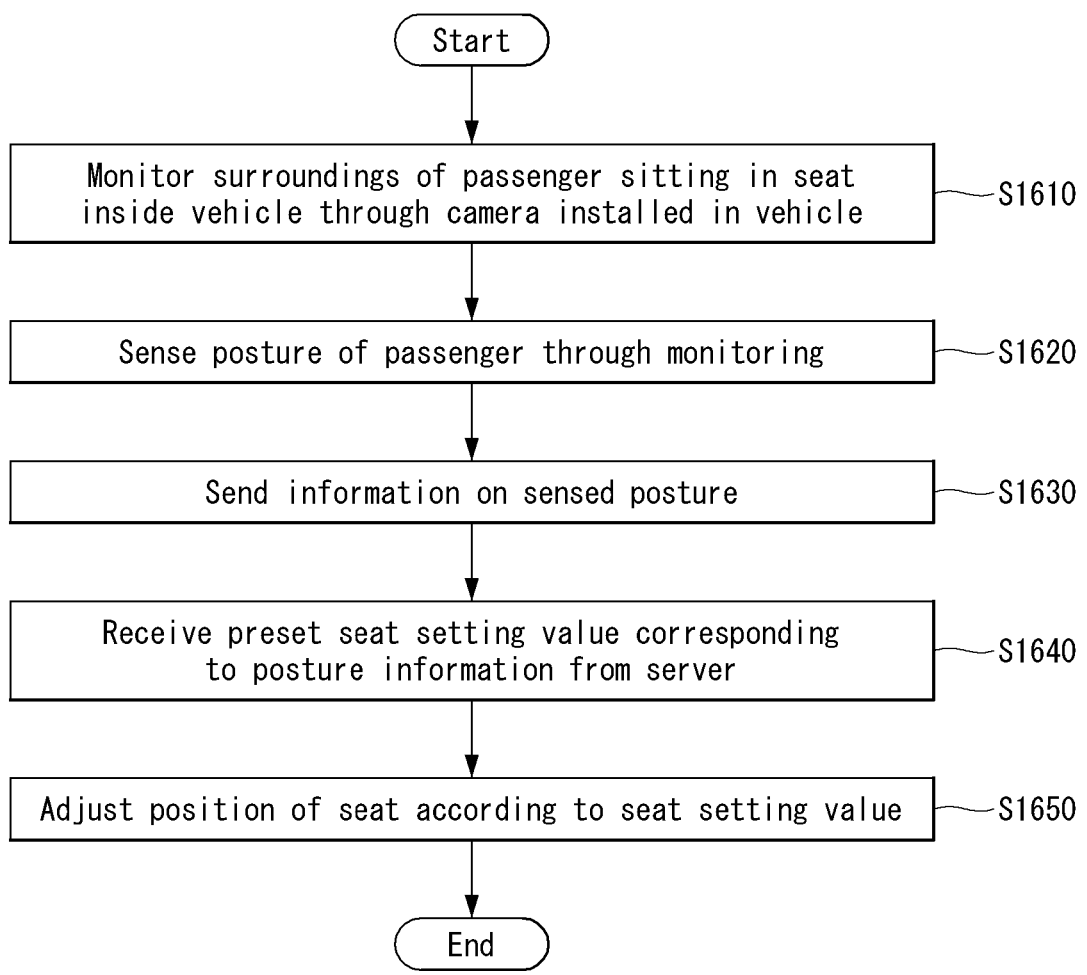
FIGS. 16 and 17 show an example in which a seat is adjusted according to a seat setting value corresponding to a passenger's behavior or posture.
Figure 17:
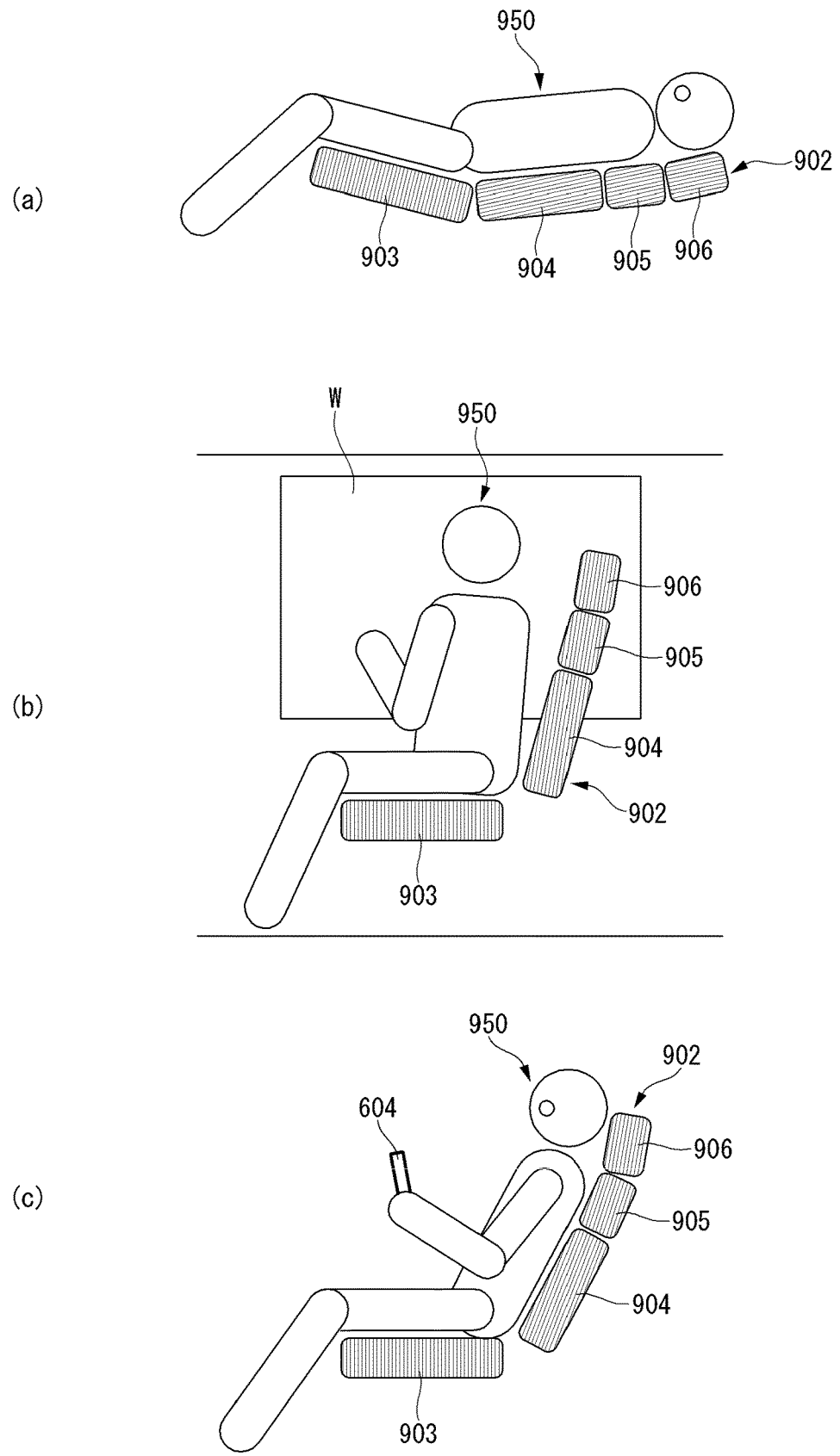

FIGS. 16 and 17 show an example in which a seat is adjusted according to a seat setting value corresponding to a passenger's behavior or posture.

Referring to FIG. 16, the processor 470 may monitor the surroundings of a passenger sitting in a seat inside the vehicle 700, through the camera 460 installed in the vehicle 700 (S1610). The processor 470 may acquire an image or video through the camera 460.

The processor 470 may sense a behavior or posture of the passenger through monitoring (S1620).

The processor 470 may send information on the sensed behavior or posture of the passenger to the server 500 (S1630). The processor 470 may send the information on the passenger's behavior or posture to the server 500 through the communication unit 420. The information on the passenger's behavior or posture may be information of a captured image or video of the passenger. The server 500 may be a control center server 500.

The processor 470 may receive a preset seat setting value corresponding to the information on the passenger's behavior or posture from the server 500 (S1640). The processor 470 may receive the preset seat setting value through the communication unit 420. The preset seat setting value may include at least one of a seat height adjustment value, a tilt adjustment value, a lumbar support adjustment value, and a headrest adjustment value. The per-passenger behavior/posture database may store a seat setting value corresponding to each behavior or posture of the passenger. The server 500 may load a seat setting value corresponding to the sensed behavior or posture of the passenger from the per-passenger behavior/posture database.

The processor 470 may adjust the position of a seat according to a seat setting value (S1650). The processor 470 may control the seat position adjusting apparatus 495 to adjust the seat according to the preset seat setting value.

When the position of the seat is adjusted according to the preset seat setting value, and, upon detecting an additional position adjustment of the seat, the processor 470 may adjust may send a seat setting value reflecting the additional position adjustment to the server 500. The processor 470 may send the seat setting value reflecting the additional position adjustment to the server 500 through the communication unit 420. The server 500 may update the seat setting value reflecting the additional position adjustment to a seat setting value corresponding to the sensed behavior or posture of the passenger.

Moreover, when the position of the seat is adjusted according to the preset seat setting value, and, upon detecting an additional position adjustment of the seat, the processor 470 may send information on the passenger's posture sensed through the camera 460 to the server 500. The server 500 may store the passenger's posture information and the corresponding seat setting value in the database.

In addition, if there is no preset seat setting value corresponding to the information on the sensed behavior or posture of the passenger, the server 500 may inform the processor 470 that there is no preset seat setting value. Alternatively, if there is no preset seat setting value corresponding to the information on the sensed behavior or posture of the passenger, the server 500 may send a certain seat setting value to the processor 470. The certain seat setting value may be a value extracted from a seat setting value corresponding to another passenger or another passenger's behavior or posture. The processor 470 may receive the certain seat setting value and display an image suggesting the certain seat setting value to the passenger or output a sound.

Furthermore, if there is no preset seat setting value corresponding to the information on the sensed behavior or posture of the passenger, the server 500 may inform the processor 470 that there is no preset seat setting value. The processor 470 may send the current seat setting value to the server 500. The server 500 may store the current seat setting value received from the processor 470 in the database, corresponding to the passenger's behavior or posture.

Furthermore, if the monitoring result shows that the passenger is having a bad posture that puts strain on the body or maintaining the same posture for a long time, the processor 470 may receive a seat setting value from the server 500 to get the passenger to change their posture.

Furthermore, if the monitoring result shows that the passenger is sleeping, having a bad posture that puts strain on the body, or maintaining the same posture for a long time, the processor 470 may receive a seat setting value from the server 500 to get the passenger to change their posture.

In this case, the specific information of FIG. 5 may include information on the passenger's posture or behavior which is acquired through the camera 460.

In this case, the information transmitted from the 5G network to the vehicle 700 may be a seat setting value corresponding to the information on the passenger's posture or behavior.

Referring to (a) of FIG. 17, the passenger 950 may lean sideways in the seat. The processor 470 may receive a seat setting value corresponding to a behavior or posture of the passenger through the camera 460. Accordingly, the processor 470 may control the seat position adjustment apparatus 495 to tilt the backrest 904, 905, and 906 with respect to the base 903 and make it fit tightly to the passenger.

Referring to (b) of FIG. 17, the passenger 950 may lie sideways in the seat. The processor 470 may receive a seat setting value corresponding to a behavior or posture of the passenger through the camera 460. Accordingly, the processor 470 may control the seat position adjustment apparatus 495 to tilt the backrest 904, 905, and 906 with respect to the base 903 and make it fit tightly to the passenger.

Referring to (c) of FIG. 17, the passenger 950 may sit crouched in the seat and look at an object, holding it in their hands. The processor 470 may receive a seat setting value corresponding to a behavior or posture of the passenger through the camera 460. Accordingly, the processor 470 may control the seat position adjustment apparatus 495 to tilt the backrest 904, 905, and 906 with respect to the base 903 and make it fit tightly to the passenger.

Figure 18:
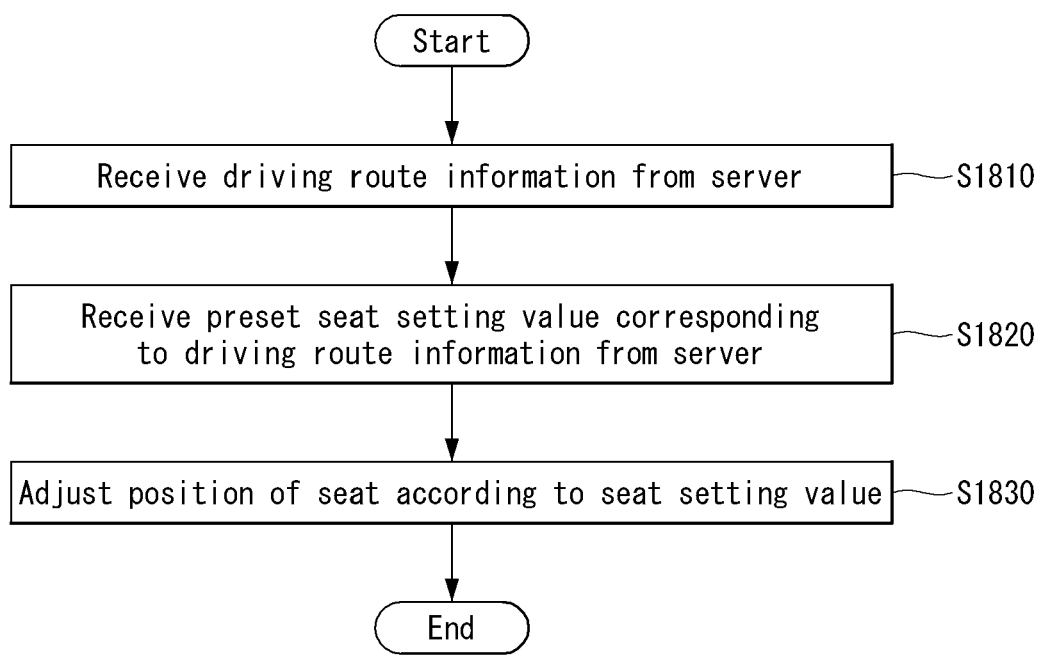
FIGS. 18 and 19 show an example in which a seat is adjusted according to a seat setting value corresponding to driving route information.
Figure 19:
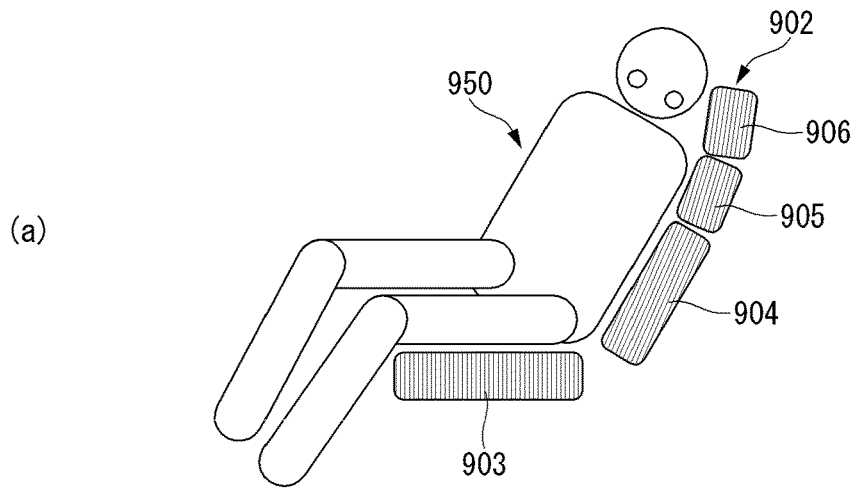
Figure 19:
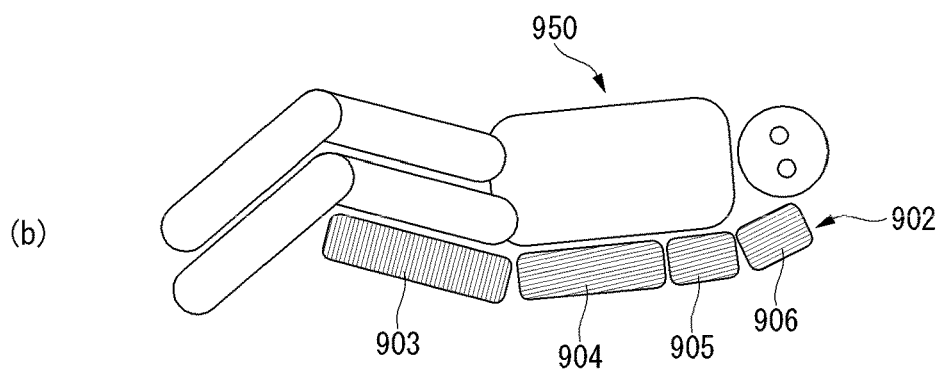
Figure 19:
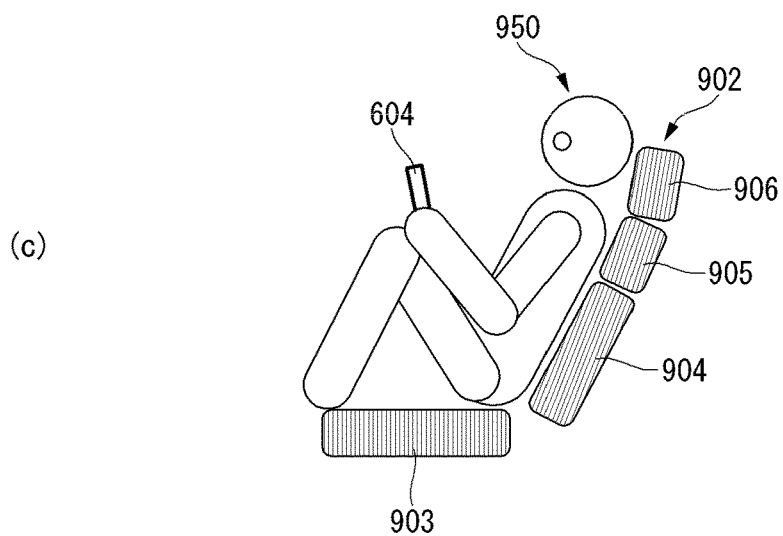

FIGS. 18 and 19 show an example in which a seat is adjusted according to a seat setting value corresponding to driving route information.

Referring to FIG. 18, the processor 470 may receive driving route information from the server 500 (S1810). The processor 470 may receive driving route information from the server 500 through the communication unit 420. The driving route information may include at least one of the vehicle 700's current location information, driving start time, driving speed information, origin information, destination information, information about a route from the origin to the destination, expected time required, driving route-based weather information, driving route-based road surface information, road information, topographical information, driving route-based traffic information, driving route-based traffic light information, en-route information, vehicle stop information, and driving mode information.

The processor 470 may receive a preset seat setting value corresponding to the driving route information from the server 500 (S1820). For example, when the driving is expected to take a long time, the processor 470 may receive an appropriate seat setting value from the server 500. Alternatively, if a road surface is uneven or rough, the processor 470 may receive a seat setting value that allows for less impact on the passenger from the server 500. Alternatively, if the passenger boards the vehicle in a commuting zone at morning rush hour, the processor 470 may receive a seat setting value that lets the passenger take a nap from the server 500. Alternatively, if the passenger boards the vehicle in a commuting zone at evening rush hour, the processor 470 may receive a seat setting value that lets the passenger take a nap from the server 500. Alternatively, if the passenger goes on a weekend trip, the processor 470 may receive a seat setting value appropriate for the passenger from the server 500 to see scenery from the window.

The preset seat setting value may include at least one of a seat height adjustment value, a tilt adjustment value, a lumbar support adjustment value, and a headrest adjustment value. The per-passenger behavior/posture database may store a seat setting value corresponding to each behavior or posture of the passenger. The server 500 may load a seat setting value corresponding to the sensed behavior or posture of the passenger from the per-passenger behavior/posture database.

The processor 470 may adjust the position of a seat according to a seat setting value (S1830). The processor 470 may control the seat position adjusting apparatus 495 to adjust the seat according to the preset seat setting value.

When the position of the seat is adjusted according to the preset seat setting value, and, upon detecting an additional position adjustment of the seat, the processor 470 may adjust the may send a seat setting value reflecting the additional position adjustment to the server 500. The processor 470 may send the seat setting value reflecting the additional position adjustment to the server 500 through the communication unit 420. The server 500 may update the seat setting value reflecting the additional position adjustment to a seat setting value corresponding to the sensed driving route information.

In addition, if there is no preset seat setting value corresponding to the driving route information, the server 500 may inform the processor 470 that there is no preset seat setting value. Alternatively, if there is no preset seat setting value corresponding to the driving route information, the server 500 may send a certain seat setting value to the processor 470. The certain seat setting value may be a value extracted from a seat setting value corresponding to another passenger or another passenger's behavior or posture. The processor 470 may receive the certain seat setting value and display an image suggesting the certain seat setting value to the passenger or output a sound.

In this case, the specific information of FIG. 5 may include information on an object around the passenger, passenger posture information, or passenger behavior information which is acquired through the camera 460.

In this case, the information transmitted from the 5G network to the vehicle 700 may be a seat setting value corresponding to the driving route information.

Referring to (a) of FIG. 19, upon detecting a passenger going to work, the processor 470 may receive a seat setting value that allows the passenger to lie back. Accordingly, the processor 470 may control the seat position adjustment apparatus 495 to tilt the backrest 904, 905, and 906 with respect to the base 903 and make it fit tightly to the passenger.

Referring to (b) of FIG. 19, upon detecting a traveling passenger, the processor 470 may receive a seat setting value that allows the passenger to look out the window W.

Referring to (c) of FIG. 19, upon detecting a passenger on board for his or her usual journey, not for going to work or traveling, the processor 470 may receive a seat setting value that allows the passenger to sit and look at a mobile terminal 604, holding it in their hands. Accordingly, the processor 470 may control the seat position adjustment apparatus 495 to tilt the backrest 904, 905, and 906 with respect to the base 903 and make it fit tightly to the passenger.

The vehicle control device according to the foregoing exemplary embodiment may enhance passengers' convenience. The vehicle control device according to the foregoing exemplary embodiment may be used during autonomous driving or semi-autonomous driving of a vehicle.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

The invention claimed is:

1. A vehicle control method for adjusting a seat, the vehicle control method comprising:
    monitoring the surroundings of a passenger sitting in the seat through a camera installed inside the vehicle;
    sensing an object around the passenger through the monitoring;
    sending object information regarding the sensed object to a server;
    receiving a preset seat setting value corresponding to the object information from the server;
    adjusting the position of the seat according to the seat setting value; and
    when the preset seat setting value corresponding to the object information is not received from the server, sending a current seat setting value as a seat setting value related to the object information to the server,
    wherein the object the preset seat setting value of which is sent from the server comprises at least one of a mobile terminal, a notebook computer, and a book.

2. The vehicle control method of claim 1, further comprising, when the position of the seat is adjusted according to the seat setting value, and, upon detecting an additional position adjustment of the seat, sending a seat setting value reflecting the additional position adjustment to the server.

3. The vehicle control method of claim 2, further comprising, after the additional position adjustment is reflected on the seat, sending information regarding the passenger's posture sensed through the camera to the server.

4. The vehicle control method of claim 1, wherein the preset seat setting value comprises at least one of a seat height adjustment value, a tilt adjustment value, a lumbar support adjustment value, and a headrest adjustment value.

5. The vehicle control method of claim 1, further comprising:
    sensing a posture of the passenger through the monitoring;
    sending information regarding the sensed posture of the passenger to the server;
    if the preset seat setting value corresponding to the object information is not received from the server, receiving a preset, second seat setting value corresponding to the posture information from the server; and
    adjusting the position of the seat according to the second seat setting value.

6. The vehicle control method of claim 5, further comprising, when the position of the seat is adjusted according to the second seat setting value, and, upon detecting an additional position adjustment of the seat, sending a seat setting value reflecting the additional position adjustment to the server.

7. The vehicle control method of claim 5, further comprising, if the preset, second seat setting value corresponding to the posture information is not received from the server, sending the current seat setting value to the server.

8. The vehicle control method of claim 1, further comprising:
    receiving driving route information and a preset, third seat setting value corresponding the driving route information from the server; and
    adjusting the position of the seat according to the third seat setting value.

9. The vehicle control method of claim 8, wherein the driving route information comprises at least one of the vehicle's current location information, driving start time, driving speed information, origin information, destination information, information about a route from the origin to the destination, expected time required, driving route-based weather information, driving route-based road surface information, road information, topographical information, driving route-based traffic information, driving route-based traffic light information, en-route information, vehicle stop information, and driving mode information.

* * * * *